United States Patent
Katayama et al.

(10) Patent No.: US 6,696,989 B2
(45) Date of Patent: Feb. 24, 2004

(54) DATA-UPDATE APPARATUS, REPRODUCTION APPARATUS, DATA-ADDITION APPARATUS, DATA-DETECTION APPARATUS AND DATA-REMOVAL APPARATUS

(75) Inventors: Taro Katayama, Osaka (JP); Tomoki Ogawa, Hyogo (JP); Noriaki Horii, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/238,889

(22) Filed: Sep. 11, 2002

(65) Prior Publication Data

US 2003/0063570 A1 Apr. 3, 2003

(30) Foreign Application Priority Data

Sep. 17, 2001 (JP) ........................................ 2001-281767
Nov. 7, 2001 (JP) ........................................ 2001-341654

(51) Int. Cl.⁷ ................................................ H03M 7/00
(52) U.S. Cl. ...................................................... 341/51
(58) Field of Search ........................ 341/51, 50; 704/230

(56) References Cited

U.S. PATENT DOCUMENTS 6,518,891 B2 * 2/2003 Tsutsui ......................... 341/51
2002/0113722 A1  8/2002 Inokuchi et al.

FOREIGN PATENT DOCUMENTS

| EP | 0 392 612 | 10/1990 |
| EP | 1 052 612 | 11/2000 |
| EP | 1 191 789 | 3/2002 |
| JP | 11-176089 | 7/1999 |
| JP | 2000-173175 | 6/2000 |
| JP | 2001-175270 | 6/2001 |
| WO | WO 00/30101 | 5/2000 |

* cited by examiner

Primary Examiner—Brian Young
(74) Attorney, Agent, or Firm—McDermott, Will & Emery

(57) ABSTRACT

This invention relates to an apparatus and method for embedding data in a signal or for updating data that has been embedded. The object of the invention is to provide a data-update apparatus that together with greatly reducing the amount of operation required for adding, detecting and removing data (electronic watermark) in a plurality of signals, makes it rigid copyright protection possible. In order to accomplish this objective, the present invention provides a data-update apparatus comprising: a channel-selection means that selects and outputs part of the channels of the input signal; a detection means that detects the electronic watermark that is embedded in the signal of the channel selected by the channel-selection means; a judgment means, to which the data detected by the detection means is input, and that determines whether or not to update the electronic watermark; an update-signal-generation means, to which an update instruction is input from the judgment means and to which the signal of the channel selected by the channel-selection means is input, and that outputs an update signal for updating the detected data; and a channel-selection-addition means that selects part of the channels of the input signal and adds the update signal to the selected channels.

18 Claims, 21 Drawing Sheets

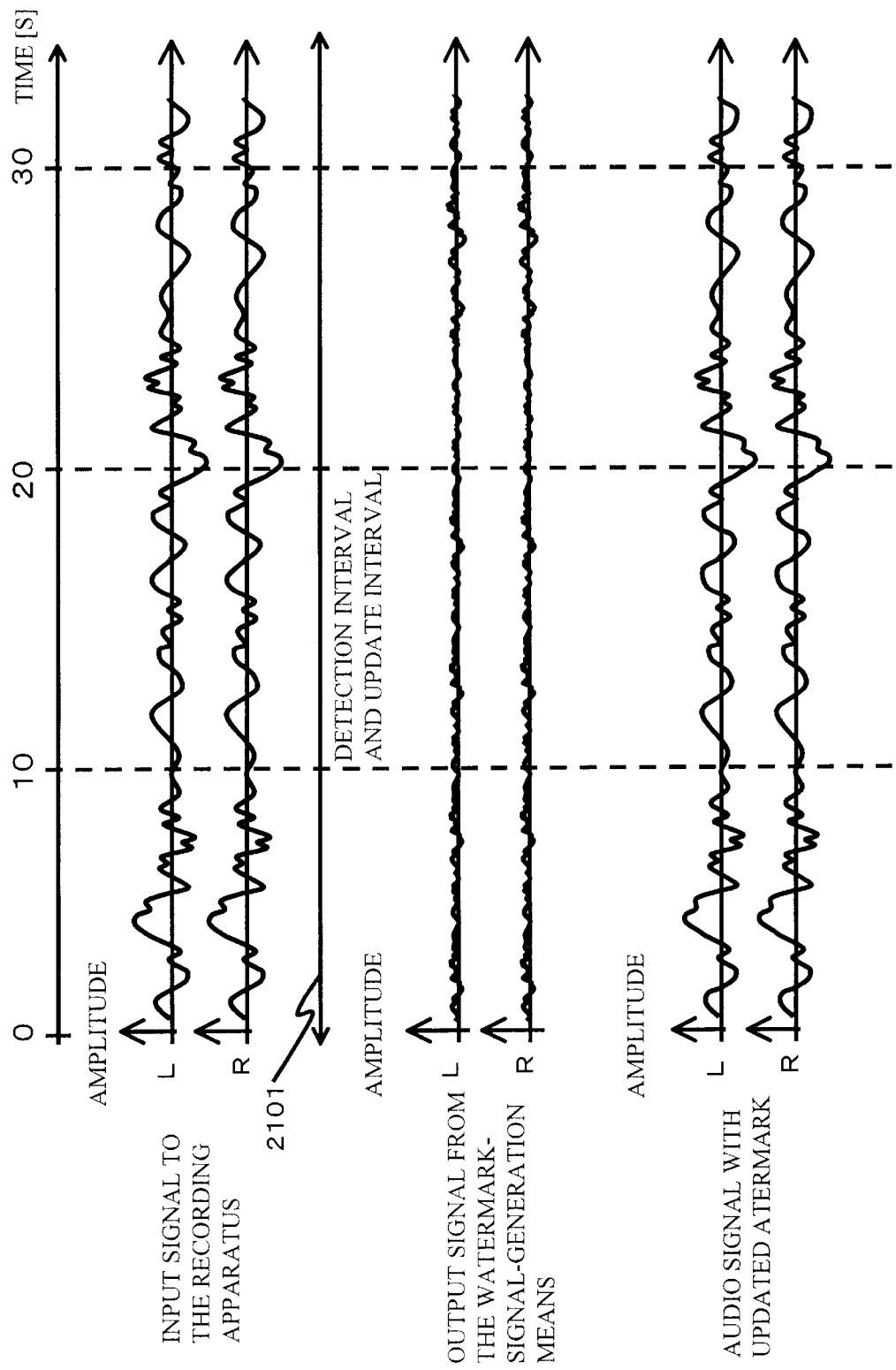

DATA-UPDATE APPARATUS, REPRODUCTION APPARATUS, DATA-ADDITION APPARATUS, DATA-DETECTION APPARATUS AND DATA-REMOVAL APPARATUS

BACKGROUND OF THE INVENTION

1. Field of the Invention

This invention relates to an apparatus and method of embedding data into a signal or updating data that are already embedded into a signal, and more particularly to an apparatus and method of embedding specific data (electronic watermark) into a plurality of audio signals, or updating specific data that have been embedded into a signal using a minimum amount of operations.

2. Description of the Related Art

In recent years, with the spread of personal computers, CD-R drives, and the Internet, and due to inexpensive high-capacity recording media such as hard disc drives and the like, pirated versions of music CDs or compressed files that have been illegally compressed on the Internet are being distributed improperly in large amounts. Improper use of these contents violates the rights of those holding the copyrights, and has become a major problem in today's society.

In the midst of this kind of situation, recently much attention has been placed on electronic watermarking technology as a new technology for copyright protection. Electronic watermarking technology, for example, is already being used in DVD audio discs and players. Electronic watermarking is a technique of embedding some digital data into an audio signal by adding minute noise or distortion that is not noticeable by human hearing. Moreover, since this electronic watermark is a very minute signal, humans cannot hear the embedded electronic watermark when a player for the music contents reproduces that audio signal.

Next, how copyrights are protected by using an electronic watermark will be explained in general. First, the disk manufacturer or copyright holder embeds digital data into the audio signal using a predetermined format, indicating 'Copy One Generation'. In the case of using technology that takes advantage of electronic watermarking as copyright protection technology for music contents, in many systems, copyright protection is performed effectively by embedding an electronic watermark in the signal output from every channel that contains music contents.

The case of embedding an electronic watermark will be explained in more detail using FIG. 19 and FIG. 20. FIG. 19 is a schematic drawing of a data-addition apparatus 1901 that is used when embedding an electronic watermark into a specific audio signal. FIG. 20 is a schematic drawing of a data-update apparatus 2011 that detects and updates an electronic watermark that was embedded by the data-addition apparatus 1901. The audio signal is a signal such as a music or voice signal that stimulates the sense of hearing when reproduced.

For example, when reproducing music contents that perform stereo output, there are two output channels for the audio signal so two kinds of audio signals are output. In this case, by equipping the data-addition apparatus 1901 with a first signal-addition means 1904 that embeds an electronic watermark into the audio signal (L channel) 1902 and outputs an audio signal 1903 embedded with an electronic watermark, and a second signal-addition means 1907 that embeds an electronic watermark into the audio signal (R channel) 1905 and outputs an audio signal 1906 embedded with an electronic watermark, electronic watermarks are embedded into two kinds of audio signals. The audio signals 1903, 1906 embedded with electronic watermarks are then recorded on a medium such as a CD or DVD as audio contents embedded with electronic watermarks, or they are recorded using a recording apparatus as data for distribution. The first and second signal-addition means 1904, 1907 use specific key data as required when embedding electronic watermarks.

Here, the data embedded as an electronic watermark are, for example, data for restricting the number of times the audio contents whose copyright is to be protected can be copied, such as 'Copy One Generation', 'No More Copies' or 'Copy Freely'; or it can be data such as an ID that is unique for all audio contents such as the IRSC (International Standard Recording Code).

The audio signal that is embedded with an electronic watermark is supplied to the consumer as a DVD audio disc sold at a shop, or music contents that are distributed via the Internet, etc. The consumer purchases the disk or distributed contents in which the electronic watermark is embedded.

An example of handling the electronic watermark when copying contents will be explained using FIG. 20 as a reference. To copy the contents recorded on the disk, the consumer can connect a reproduction apparatus 2001 with a recording apparatus 2002, and record the contents reproduced by the reproduction apparatus 2001 with the recording apparatus 2002. In this way, for example, the music on a DVD audio disc is copied onto a recording medium 2010, however, in the recording apparatus 2002, a data-update apparatus 2011 detects the electronic watermark that is embedded on the disk and determines whether the music to be copied are allowed to be copied.

In the case that a 'Copy One Generation' electronic watermark is embedded in the music to be copied, the electronic watermark is updated to 'No More Copies' and recorded. Updating the electronic watermark will be explained in detail.

First, the audio signal that is input to the recording apparatus 2002 is a two-channel stereo signal having a L-channel (audio signal 1903 that is embedded with an electronic watermark) and a R-channel (audio signal 1906 that is embedded with an electronic watermark). The L-channel audio signal 1903 that is input to the recording apparatus 2002 is input to a first detection means 2003, and the first detection means 2003 detects the electronic watermark that is embedded in the L-channel audio signal 1903. A first judgment means 2004 determines whether or not the electronic watermark that is detected and input by the first detection means 2003 needs to be updated.

In other words, when the embedded electronic watermark is 'Copy One Generation', and the recording apparatus 2002 is trying to record music onto a recording medium 2010, the first judgment means 2004 sends an instruction to a first watermark-generation means 2005 to update the electronic watermark. The L-channel audio signal 2001 is then input to the first watermark-generation means 2005, and based on this audio signal, the first watermark-generation means 2005 generates an electronic watermark that cannot be heard by human hearing and which indicates 'No More Copies'.

The update watermark that is generated by the first watermark-generation means 2005 is added to the L-channel audio signal 1903 and then input to the recording means 2009. Likewise, in the case of the R-channel audio signal 1906, an update watermark signal for channel-R is generated by a second detection means 2006, second judgment means 2007 and second watermark-generation means 2008, and then it is added to the R-channel audio signal 1906 and input to the recording means 2009.

The recording means 2009 records the audio signals for each channel, whose electronic watermarks have been updated, onto the recording medium 2010.

Generally, the copy-control data for music usually does not differ between channels, so in the prior recording apparatus shown in FIG. 20, the second detection means 2006 and second judgment means 2007 can be omitted, and a switch that selects the channel can be located prior to the first judgment means to detect the audio signal for either the L-channel or R-channel and determine whether or not it must be updated. However, in the prior recording apparatus, in order to update the electronic watermark for both channels, the first watermark-generation means 2005 and second watermark-generation means 2008 are necessary.

Therefore, in the process above, when trying to use the reproduction apparatus and recording apparatus to copy the copied music again, later generation copying, for example second-generation or third-generation copying is not possible. With this process, it is possible to prevent unlimited copying of music and to protect the copyright of the music.

However, in the case of embedding an electronic watermark in each audio signal of two-channel contents for example, the amount of operations required is double that required for the case of only one channel. Naturally, in the case of embedding an electronic watermark in a maximum six-channel audio signal as in the case of DVD-Audio, six times the amount of operations is required, and as the amount of required operations increases, a problem exists in that the production cost, such as for the data-addition apparatus, becomes high due to the increased amount of memory and operation circuits.

Also, it is necessary for the data-update apparatus that updates the electronic watermark to be able to detect the electronic watermark and remove the electronic watermark when necessary. Here, it is possible for electronic watermarks that are embedded separately in multi-channel audio signals to have different waveforms even though the data of the electronic watermarks may be the same. This occurs when using a method of generating the electronic watermarks to be embedded separately based on the audio signals in which the electronic watermarks are to be embedded. In this case, it is necessary for the data-detection apparatus, data-removal apparatus and data-update apparatus to perform operations for detecting (extracting) the respective electronic watermarks for each audio signal, so several times the amount of operations is required than when embedding the electronic watermarks. As a result, a problem exists in that the production costs, such as for the data-detection apparatus, data-removal apparatus and data-update apparatus, increase due to the increase in the amount of memory and operation circuits that accompany the increase in the amount of required operations.

Also, when embedding electronic watermarks for the purpose of protecting the copyright of a music, generally the same electronic watermark data are embedded repeatedly in the audio signals of that music. This is done in order to prevent improperly copying just a part of the music.

Conventionally, to update electronic watermarks that were repeatedly embedded in the music, the data-update apparatus detected watermarks at each pre-determined watermark-detection interval of time and determined whether or not it was necessary to update the watermark based on the detected original data, and then updated the electronic watermark. In the case of an electronic watermark that uses a spectrum spread system, for example, there is an update method that writes over the electronic watermark using a different key than was used when embedding the original watermark.

In this case, as shown in FIG. 21, it was necessary for the prior data-update apparatus and recording apparatus to cover the entire music to detect the watermark when updating the electronic watermark of music and then to embed a different watermark. When a recording apparatus, or in other words, typical consumer-use recorder performs this, a problem existed in that recording took an extremely long time because the watermarks for the entire music is detected then updated.

SUMMARY OF THE INVENTION

Being proposed based on the problems described above, it is the object of this invention to provide a data-addition apparatus, data-detection apparatus, data-removal apparatus, data-update apparatus and reproduction apparatus that makes strict copyright protection possible, as well as makes it possible to greatly reduce the amount of operations required for adding, detecting, removing or updating data (electronic watermarks) in a plurality of signals.

This invention relates to a data-update apparatus that detects electronic watermarks that are embedded in input audio signals and updates the electronic watermarks when necessary, a reproduction apparatus that reproduces the audio signals including the electronic watermarks, and a data-addition apparatus, data-detection apparatus and data-removal apparatus that add, detect and remove electronic watermarks, respectively.

First, the data-update apparatus of this comprises: a channel-selection means that selects one or more channels of an input signal having a plurality of channels and outputs the channel signal corresponding to that channel; a detection means that detects an electronic watermark (data) that is embedded in the channel signal that corresponds to the channel selected by the channel-selection means; a judgment means, to which the data detected by the detection means are input, and that determines whether or not to update the electronic watermark; an update-signal-generation means that outputs an update signal for updating the detected data; and a channel-selection-addition means that adds the update signal to the selected channel.

The detection means can detect data embedded in the input signal only once, or can detect data embedded in the input signal twice, or can continue to detect data embedded in the input signal until the detection results indicate that updating the data is necessary.

Furthermore, it is also possible to have a channel-control means that specifies the channel to be selected by the channel-selection means and channel-selection-addition means.

Also, the channel-selection means can switch and select among two or more channels at specified intervals of time.

Also, the detection time of the detection means for detecting data included in the input signal is a specified time unit multiplied by the number of channels.

It is possible for the channel-control means to compare the amplitude level of the signal for each channel included in the input signal, and select the channel having the maximum amplitude level.

Moreover, the channel-control means may specify the channel based on a record of channels already selected.

Furthermore, the channel-selection-addition means may also add the update signal to channels that were not selected by the channel-selection means.

Also, comprising a first additions means that adds the signals of the channels of the input signal, and a second addition means that adds the update signal from the update-signal-generation means to the signals corresponding to the channels added by the first additions means, the update-signal-generation means may also output an update signal based on the signals added by the first addition means. Furthermore, the second addition means may add update signals to the input signals of channels other than the channels to which an update signal was added by the first addition means.

Also, channel data that specify the channels to be selected can be input to the channel-selection means, and the channel-selection means can output a channel signal based on that channel data, or it is possible to further have a recording means that correlates and records the input signals and channel data selected by the channel-selection means.

The reproduction apparatus of this invention comprises: a reproduction means that reproduces input signals in which data have been embedded, and outputs those signals as output signals; a channel-selection means, to which the output signals are input, and that selects one or more channels and together with outputting the channel signals, outputs the selected channels as channel data; a detection means that detects and output data that are embedded in the channel signals; and a transmission means that sends the channel data output by the channel-selection means and the data detected by the detection means to a specified terminal.

Moreover, the reproduction apparatus of this invention comprises: a reproduction means that reproduces an input signal having a plurality of channels; and channel-selection means that selects from the input signal and channel data that indicate whether or not the data in the input signal have been updated, channels for which the data have not been updated and outputs those channel signals; an update-signal-generation means that detects data that are embedded in the channel signal and outputs an update signal that updates the data; and a channel-selection-addition means that adds the update signal to the output signal from the reproduction means.

Furthermore, the data-addition apparatus of this invention is presumed to add a specified addition signal to each of the audio signals. Here, a first operation means outputs an addition-target signal that includes all of the plurality of input audio signals, and a separation signal that includes at least two audio signals of the plurality of audio signals; and the signal-addition means adds the specified addition signal to the addition-target signal and outputs the result as an addition-completed signal. A second operation means separates the plurality of audio signals, to which the specified addition signal was added, based on the addition-completed signal and the separation signal.

Also, the data-detection apparatus of this invention is presumed to detect the addition signal from a plurality of audio signals to which the addition signal was added. Here, a third operation means outputs a detection-target signal that includes all of the input audio signals, and the signal-detection means detects the specified addition signal from the detection-target signal.

Moreover, the data-removal apparatus of this invention is presumed to remove the addition signal from the plurality of audio signals to which the addition signal was added. Here, a fourth operation means outputs a removal-target signal that includes all of the input audio signals, and a separation signal that includes at least two audio signals from the plurality of audio signals; and the signal-detection means detects the addition signal from the removal-target signal. Then, the signal-removal means removes the addition signal from the removal-target signal and outputs the result as a removal-completed signal; and a fifth operation means separates the plurality of audio signals from which the addition signal was removed based on the removal-completed signal and the separation signal.

Furthermore, the data-update apparatus of this invention is presumed to update a first addition signal that was added to the plurality of audio signals. Here, a sixth operation means outputs a detection-target signal that includes all of the input audio signals, and a separation signal that includes at least two of the audio signals; and the signal-detection means detects a first addition signal from detection-target signal. Furthermore, the signal-addition means adds a second addition signal to the detection-target signal based on the first addition signal that was detected by the signal-detection means, and together with outputting an addition-completed signal, a seventh operation means separates the audio signals to which the first and second additions signals were added based on the addition-completed signal and the separation signal.

Moreover, the signal-removal means removes the first addition signal, which was detected by the signal-detection means from the detection-target signal that was output by the sixth operation means, and outputs the result as a removal-completed signal; then the data-addition means adds a second addition signal to the removal-completed signal and outputs the result as an addition-completed signal, and the seventh operation means separates the audio signal to with the second addition means was added based on the addition-completed signal and the separation signal.

The data-addition apparatus, data-detection apparatus, data-removal apparatus, data-update apparatus and reproduction apparatus can also be realized using a computer. In this case, each process can be performed by operating a program on the computer.

BRIEF DESCRIPTION OF THE DRAWINGS

FIG. 21 is a drawing that gives a summary of the audio signal, and update watermark signal for a prior recording apparatus.

DESCRIPTION OF THE PREFERRED EMBODIMENTS

To provide a better understanding of the invention, the preferred embodiments of the invention will be explained with reference to the drawings. The embodiments described below are only examples of the invention and do not limit the technical scope of the invention.

(Embodiment 1)

First, the data-addition apparatus of a first embodiment will be explained using FIG. 1. In this first embodiment of the invention, the audio signal that is input to the data-addition apparatus will be a two-channel audio signal.

Figure 1:
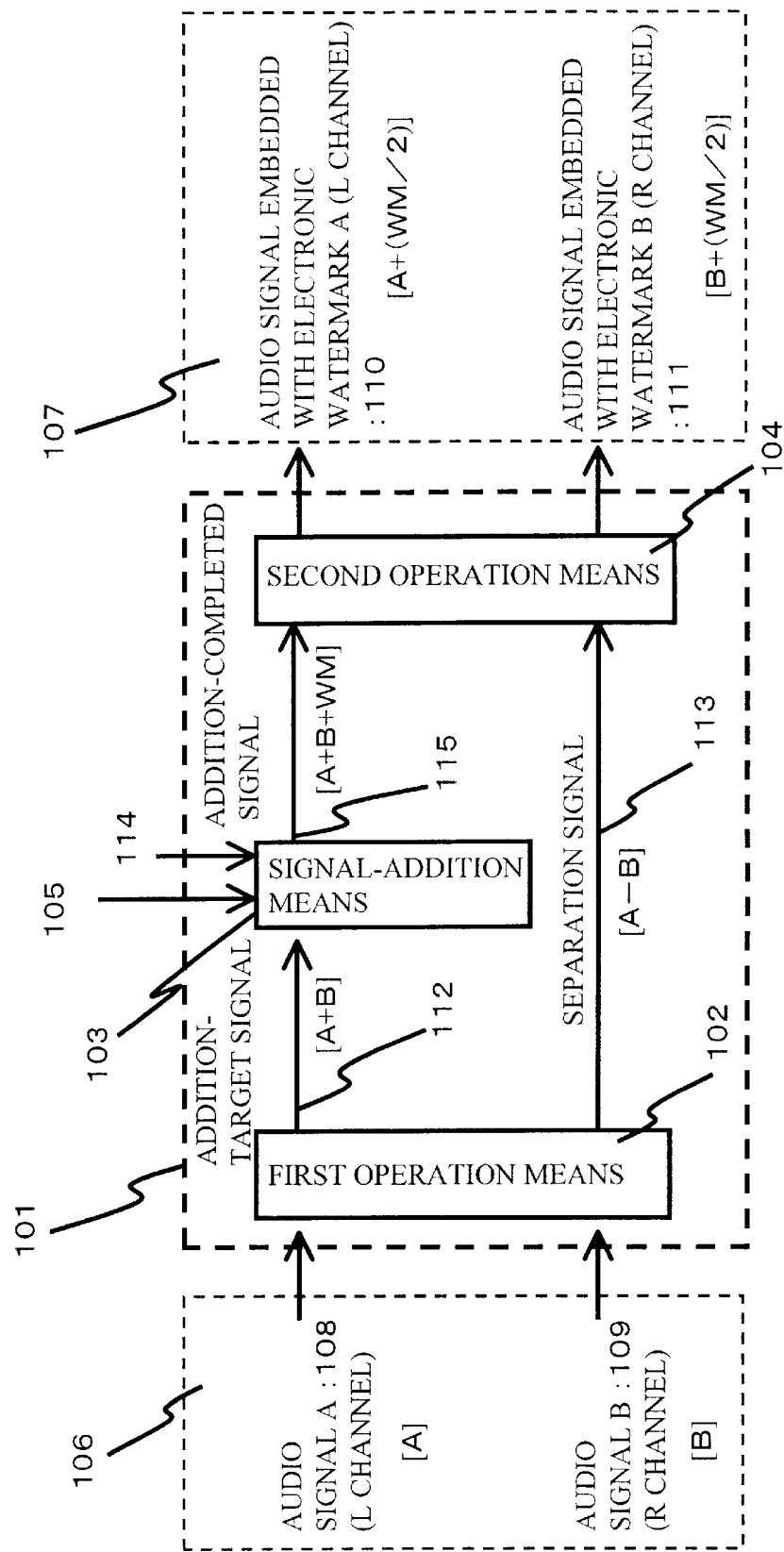
FIG. 1 is a block diagram showing a summary of the function of the data-addition apparatus.

As shown in FIG. 1, the data-addition apparatus 101 of this first embodiment comprises a first operation means 102, a signal-addition means 103 and a second operation means 104. A detailed explanation of the processing of each means will be given in order below.

First, a plurality of audio signals are input to the data-addition apparatus 101. The plurality of audio signals are signals that are reproduced as sound at the same time during reproduction, and are output from a plurality of channels. The audio signals that are input here are audio signal A 108 and audio signal B 109, and they correspond respectively to the L channel and R channel of a stereo output. The method of inputting the audio signals is not particularly set, and for example, a separate music-reproduction apparatus can be connected to the data-addition apparatus 101, and the audio signals can be signals that are input from that music-reproduction apparatus. An example of the music-reproduction apparatus could be a CD player, record player or the like, and the audio signals could, for example, be provided in linear PCM (Pulse Code Modulation) format or analog format, which are typical audio data formats. In the case that the output of the music-reproduction apparatus is an analog signal, the data-addition apparatus 101 can when necessary, convert the signal beforehand to a digital signal.

The audio signals A 108 ([A]) and B 109 ([B]) that are input to the data-addition apparatus 101 are first sent to the first operation means 102. Next, the first operation means 102 performs the following operations using the audio signal A 108 and audio signal B 109. In other words, the first operation means 102 adds the audio signal A 108 and audio signal B 109, and outputs an addition-target signal 112 ([A+B]) to which the addition signal is to be added. Furthermore, the first operation means 102 subtracts the audio signal B 109 from the audio signal A 108 and outputs a separation signal 113 ([A−B]).

Next, the addition-target signal 112 is input to the signal-addition means 103, and here the addition signal 114 ([WM]) is added using a first key 105, for example. The addition signal 114 can be any kind of signal that can for example contain copyright control data for the audio signals A 108, B 109, an electronic watermark for embedding other data, or a noise signal for restricting the quality of the audio signals A 108, B 109 can be listened to. Also, it can be a signal (noise) that is generated based on an input signal (here, this is the addition-target signal 112).

Here, the addition signal 114 will be an electronic watermark, and this electronic watermark includes data for restricting the number of copies that can be made. Also, the first key 105 is a key for extracting the addition signal 114 during reproduction.

The signal-addition means 103 adds the addition signal 114 to the addition-target signal 112, and outputs the result as an addition-completed signal 115 ([A+B+WM]).

The separation signal 113 that is output from the first operation means 102, and the addition-completed signal 115 that is output from the signal-addition means 114 are input to a second operation means 104, and the second operation means 104 adds the addition-completed signal 115 and the separation signal 113, then divides the resulting signal by two (divides the output in half) and outputs an audio signal A 110 ([A+WM/2]) with embedded electronic watermark. The audio signal A 110 with embedded electronic watermark that is obtained here is the audio signal A 108 to which the addition signal (WM) 114 is added. However, the level (signal intensity) of the addition signal (WM) inside the audio signal A 110 with embedded electronic watermark becomes half when divided.

Also, the second operation means 104 subtracts the separation signal 113 from the addition-completed signal 115, then divides the resulting signal by two and outputs an audio signal B 111 ([B+WM/2]] with embedded electronic watermark. The audio signal B 111 with embedded electronic watermark that is obtained here is the audio signal B 109 to which the addition signal (WM) 114 is added. However, the level (signal intensity) of the addition signal (WM) inside the audio signal B 111 with embedded electronic watermark also becomes half when divided.

The audio signals A 110, B 111 with embedded electronic watermark are recorded on a medium such as a CD or DVD as audio contents 107 with embedded electronic watermark, or it is stored in a storage apparatus as data for distribution.

As described, by the signal-addition means simply adding an addition signal to just the addition-target signal, which includes the input audio signals A and B, it is possible to add the addition signal to both audio signal A and audio signal B. Naturally, during output it is possible for the second operation means to separate audio signal A and audio signal B by a simple operation.

Here, the operations performed on the input signals by the first operation means and second operation means are addition, however the operations that can be performed by the first and second operation means are the simple four arithmetic operations, so the amount of operations are much fewer than for embedding an electronic watermark. Therefore, the operations of the overall data-addition apparatus 101 are much less than adding a signal to each input signal separately.

This makes it possible to greatly reduce the amount of operations performed by the data-addition apparatus, and thus it is possible to reduce costs when manufacturing the data-addition apparatus. Also, as a result of fewer operations, it becomes possible to speed up the process of adding an addition signal to a plurality of signals.

For the data-addition apparatus 101 of this first embodiment, the input signals were two-channel (two signals), however, it is also possible to apply this to even more channels. A processing method for multiple channels will be explained later for another embodiment.

Furthermore, the addition-target signal 112 in the data-addition apparatus 101 was the sum of the audio signal A 109 and audio signal B 109, however, the addition-target signal 112 could also be a signal obtained by subtracting the audio signal B 109 from the audio signal A 108, and the separation signal 113 could be the sum of the audio signal A 108 and audio signal B 109. However, in the case of stereo audio signals as described above, the correlation between the signals is high, so the signal strength of a signal obtained by subtracting two signals often becomes small. In that case, it is preferred that the addition-target signal be an audio signal obtained by adding the audio signals.

Figure 2:
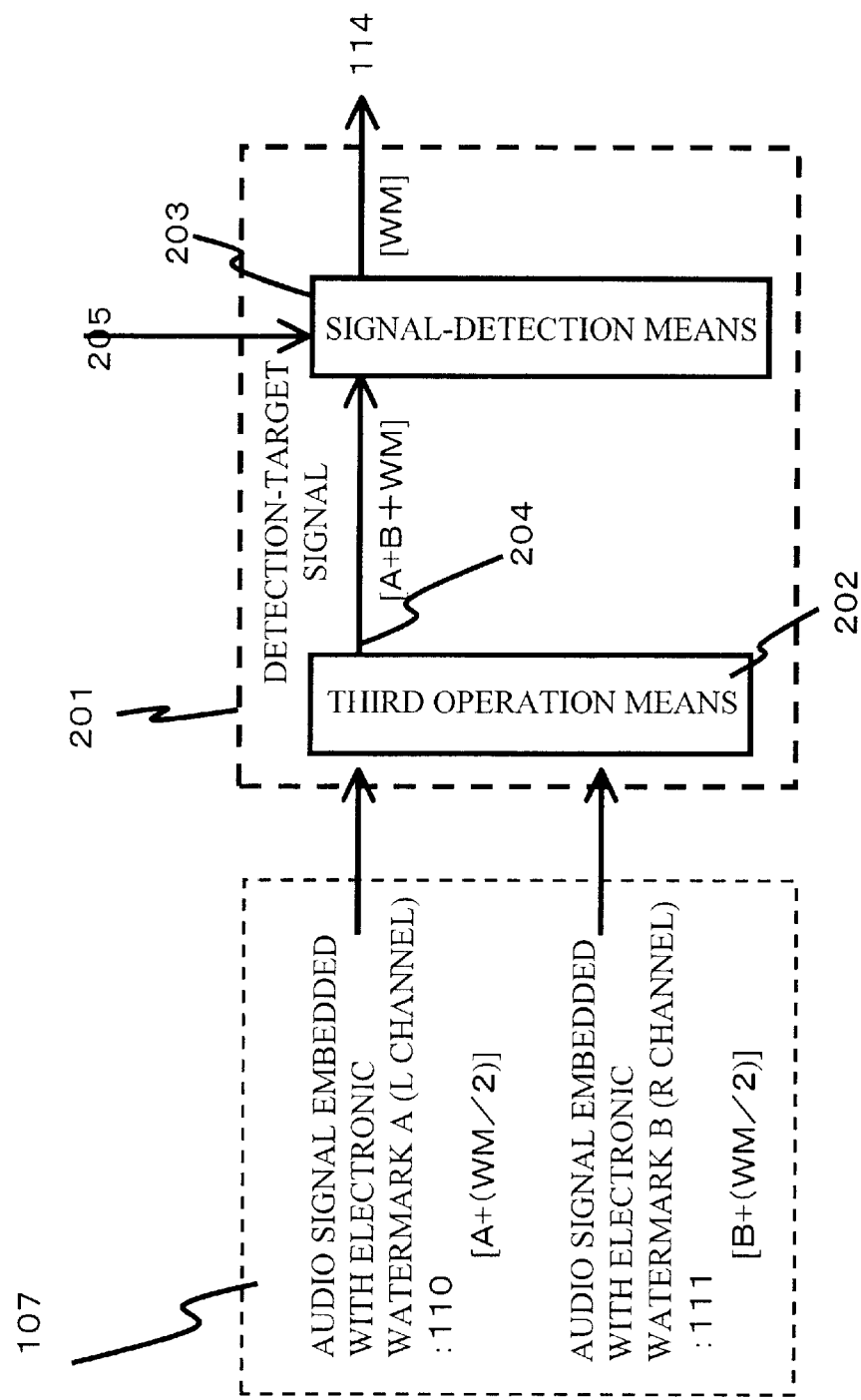
FIG. 2 is a block diagram showing a summary of the function of the data-detection apparatus.

Next, the data-detection apparatus 201 of this first embodiment that is shown in FIG. 2 will be explained. The data-detection apparatus 201 is an apparatus that detects (extracts) the addition signal that has been added by the data-addition apparatus 101.

By acquiring and reproducing the audio contents 107 with embedded electronic watermarks that are output from the data-addition apparatus 101, it is possible to obtain the audio signal A 110 ([A+WM/2]) with embedded electronic watermark and audio signal B 111 ([B+WM/2]) with embedded electronic watermark. The method of acquiring the audio contents 107 with embedded electronic watermarks, can be for example, a CD (Compact Disc) or DVD (Digital Versatile Disc), or be distributed using a network.

The obtained audio signals A 110, B 111 embedded with electronic watermarks are input to a third operation means 202 of the data-detection apparatus 201. Next, the third operation means 202 adds the audio signals A 110, B 111 embedded with electronic watermarks and then divides them with a specified constant and outputs a detection-target signal 204 ([A+B+WM]). The specified constant corresponds to the operation used when adding the addition signal 114 by the signal-addition means 101, and is for example '1'.

From this, the detection-target signal 204 that is output from the third operation means 202 is in the state of that when the addition signal 114 was added by the signal-addition means 103.

Next, the detection-target signal 204 is input to a signal-detection means, and the addition signal 114 is detected (extracted) by using a second key 205, for example, that corresponds to the first key 105. Since the detection-target signal 204 is in the state of that when the addition signal 114 was added by the signal-addition means 103, the process used for detection can be a conventional electronic watermark detection method.

The addition signal 114 that is detected by the signal-detection means 203 is output by the signal-detection means 203, and when necessary, it is sent to a specific means that performs various processes using the data included in the addition signal 114.

As described above, by performing a simple operation on the audio signals A 110, B 111 embedded with an electronic watermark by the third operation means, it is possible to obtain a signal that is in the state of that when the addition signal was added by the signal-addition means, and so it is possible to detect the addition signal using a conventional electronic watermark detection means.

Figure 3:
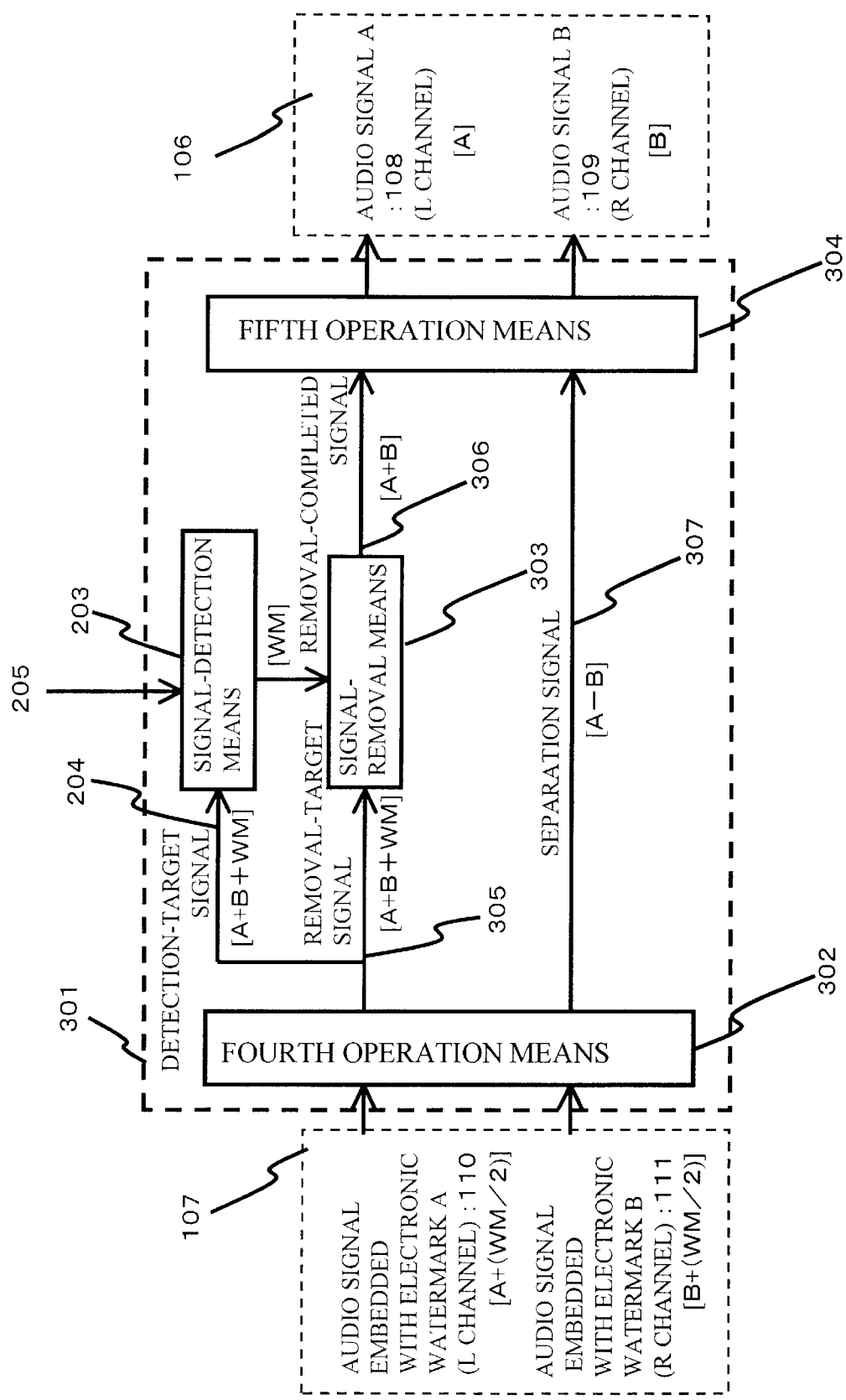
FIG. 3 is a block diagram showing a summary of the function of the data-removal apparatus.

Next, the data-removal apparatus 301 of this first embodiment that is shown in FIG. 3 will be explained. The data-removal apparatus 301 is an apparatus that removes the addition signal that was added by the data-addition apparatus 101.

By acquiring and reproducing the audio contents 107 embedded with an electronic watermark that are output from the data-addition apparatus 101, it is possible to obtain the audio signal A 110 ([A+WM/2]) embedded with an electronic watermark and the audio signal B 111 ([B+WM/2]) embedded with an electronic watermark. The method of acquiring the audio contents 107 embedded with an electronic watermark can be, for example, a CD or DVD, or distributed using a network.

The obtained audio signals A 110, B 111 embedded with an electronic watermark are input to a fourth operation means 302 of the data-removal apparatus 301. Next, the fourth operation means 302 adds the input audio signals A 110, B 111 embedded with an electronic watermark, and divides them with a specified constant, then outputs a removal-target signal 305 ([A+B+WM]) (this signal is the same as the detection-target signal 204). Also, the fourth operation means 302 subtracts the input audio signal B 111 embedded with an electronic watermark from the audio signal A 110 embedded with an electronic watermark, and outputs a separation signal 307 (A−B).

The specified constant corresponds to the operation used when adding the addition signal 114 by the signal-addition means 101, and is for example '1'.

The removal-target signal 305 that is output from the fourth operation means 302 in this way is the same as the signal when the addition signal 114 is added by the signal-addition means 103.

Next, the detection-target signal 204 is input to the signal-detection means 203, and the addition signal 114 [WM] is detected (extracted) using, for example, the second key 205 that corresponds to the first key 105. The method of detecting the addition signal 114 is the method explained for the data-detection apparatus 201.

The detected addition signal 114 is input to the signal-removal means 303. Here, the signal-removal means 303 subtracts the input addition signal 114 from the input removal-target signal 305 (detection-target signal 204), and outputs a removal-completed signal 306 ([A+B]).

Next, the removal-completed signal 306 and separation signal 307 are input to a fifth operation means 304, and this fifth operation means 304 adds the removal-completed signal 306 and separation signal 307, and divides the result by 2 to obtain audio signal A 108, then outputs audio signal A 108.

Also, the fifth operation means 304 subtracts the separation signal 307 from the removal-completed signal 306, and divides the result by 2 to obtain the audio signal B 109, then outputs the audio signal B 109.

The audio signal A 108 and audio signal B 109 that are obtained here make up the audio contents 106 that are the same as the contents input to the data-addition apparatus 101, or in other words the audio contents 106 to which the addition signal 114 is not added.

By using the fourth operation means to perform simple operations on the audio signals A 110, B 111 embedded with an electronic watermark in this way, it is possible to obtain a signal in the state of that of the signal to which the addition-signal was added by the signal-addition means, so it is possible to detect the addition signal using a conventional electronic watermark detection method. Also, since the removal-target signal contains all of the plurality of audio signals, it is possible to remove the addition signal from all at once with the removal process, and thus the amount of operations performed is just a fraction (1/number of audio signals) of those performed when adding a separate addition signal to each signal.

In the data-detection apparatus 201 it is also possible, for example, to detect the addition signal (WM) using only the audio signal A 110 (A+(W/2)) embedded with an electronic watermark. In this case as well, it is possible to use just the second key 205 as in the case explained above, however, in order to accurately detect the addition signal, it is preferred that the detection-target signal 204 (A+B+WM) be used.

In the case of detecting the addition signal 114 by using the audio signal A 110 (A+(WM/2)), the level (intensity) of the addition signal 114 that is included in the audio signal A 110 is half the level. As a reference, the method for detecting the addition signal 114 when the level of the addition signal is small is given below.

Figure 5:
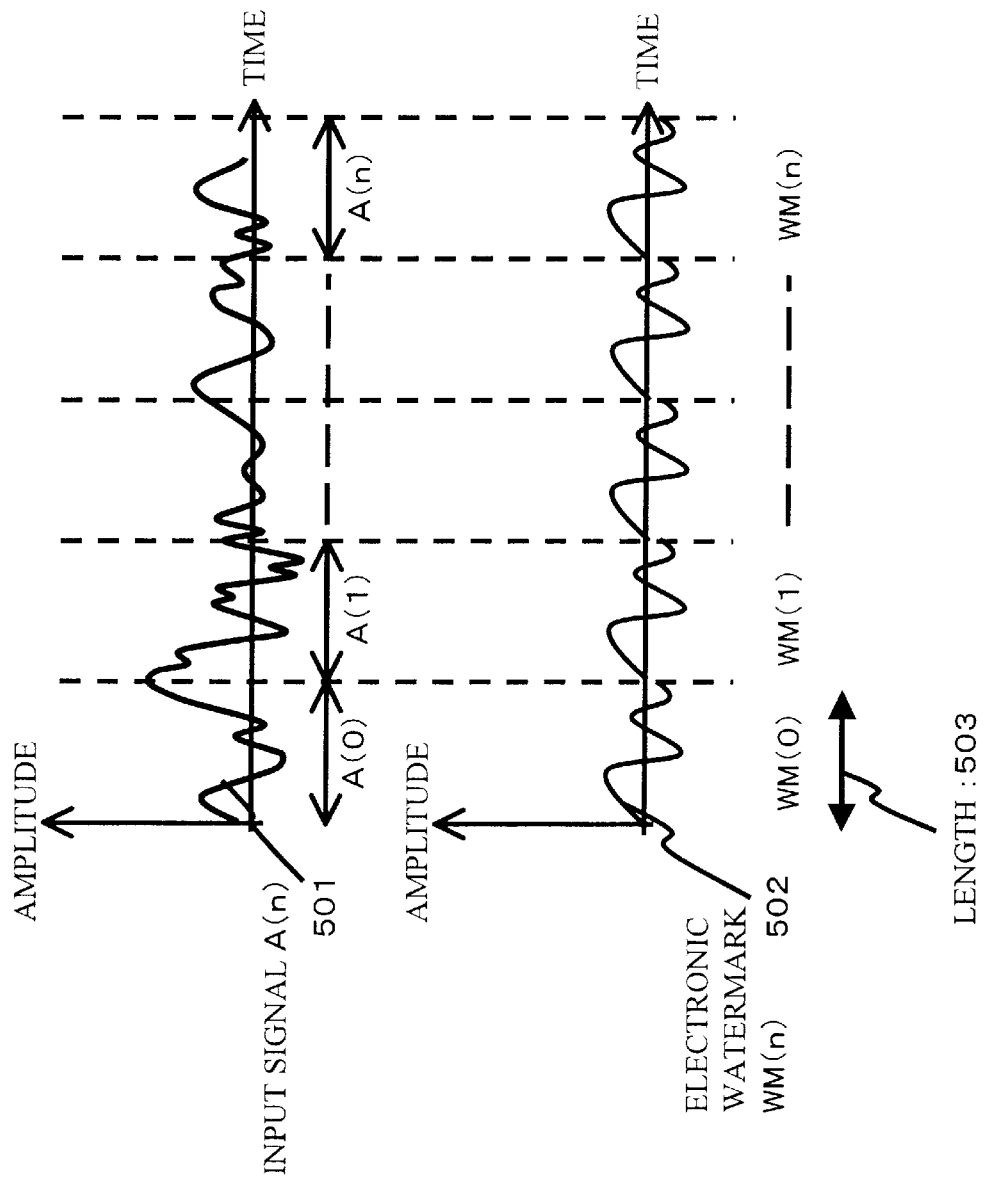
FIG. 5 is a drawing for explaining the method of detecting the addition signal when the level of the addition signal is small.

In other words, in FIG. 5, the input signal 501 is the audio signal before embedding the electronic watermark, and the electronic watermark 502 is the addition signal that is added to the input signal 501.

Generally, the electronic watermark that is embedded using a spread spectrum method is a signal having a fixed length 503 that is repeated. By dividing the electronic watermark 502 into fixed lengths, WM(0), WM(1) . . . WM(n), arbitrary watermarks WM(m) and WM(1) (0<m<n) are signals having very high correlation.

Also, the signals obtained by dividing the input signal 501 into fixed lengths 503 are A(0), A(1), . . . , A(n)m and are different from the electronic watermark, arbitrary A (m) and A (1) (0<m<n) are signals that have low correlation.

Therefore, when the signal 502 is added to the input signal 501 as an electronic watermark to obtain signals divided in fixed lengths, AWM(0), AWM(1), . . . AWM(n), the signal embedded as an electronic watermark is detected by calculating the synchronized sum of the divided signal (AWM(0)+AWM(1)+ . . . +AWM(n)).

More specifically, the synchronized sum (AWM(0)+AWM(1)+ . . . +AWM(n)) is the sum of the synchronized sum of the input signal 501 (A(0)+A(1)+ . . . +A(n)) and the synchronized sum of the electronic watermark 502 (W(0)+WM(1)+ . . . +WM(n)). Here, the synchronized sum of the audio signal with low correlation A(0)+A(1)+ . . . +A(n) becomes a low-level signal, and the synchronized sum of the signal having high correlation WM(0)+WM(1)+ . . . +WM(n) becomes a high-level signal, therefore the electronic watermark 502 is a high-level signal with respect to the input signal 501 and is detected as the watermark.

Here, the audio signal A 110 embedded with an electronic watermark is expressed as (A+(WM/2)), and the level of the signal embedded as an electronic watermark is halved, however, by increasing the number of calculations of the synchronized sum, the level of the signal embedded as an electronic watermark is sufficiently large with respect to the value of the original signal A after calculating the synchronized sum, so it can be detected as the electronic watermark. In other words, when the embedded signal level is large, it is possible to reduce the number of calculations of the synchronized sum.

(Embodiment 2)

Figure 4:
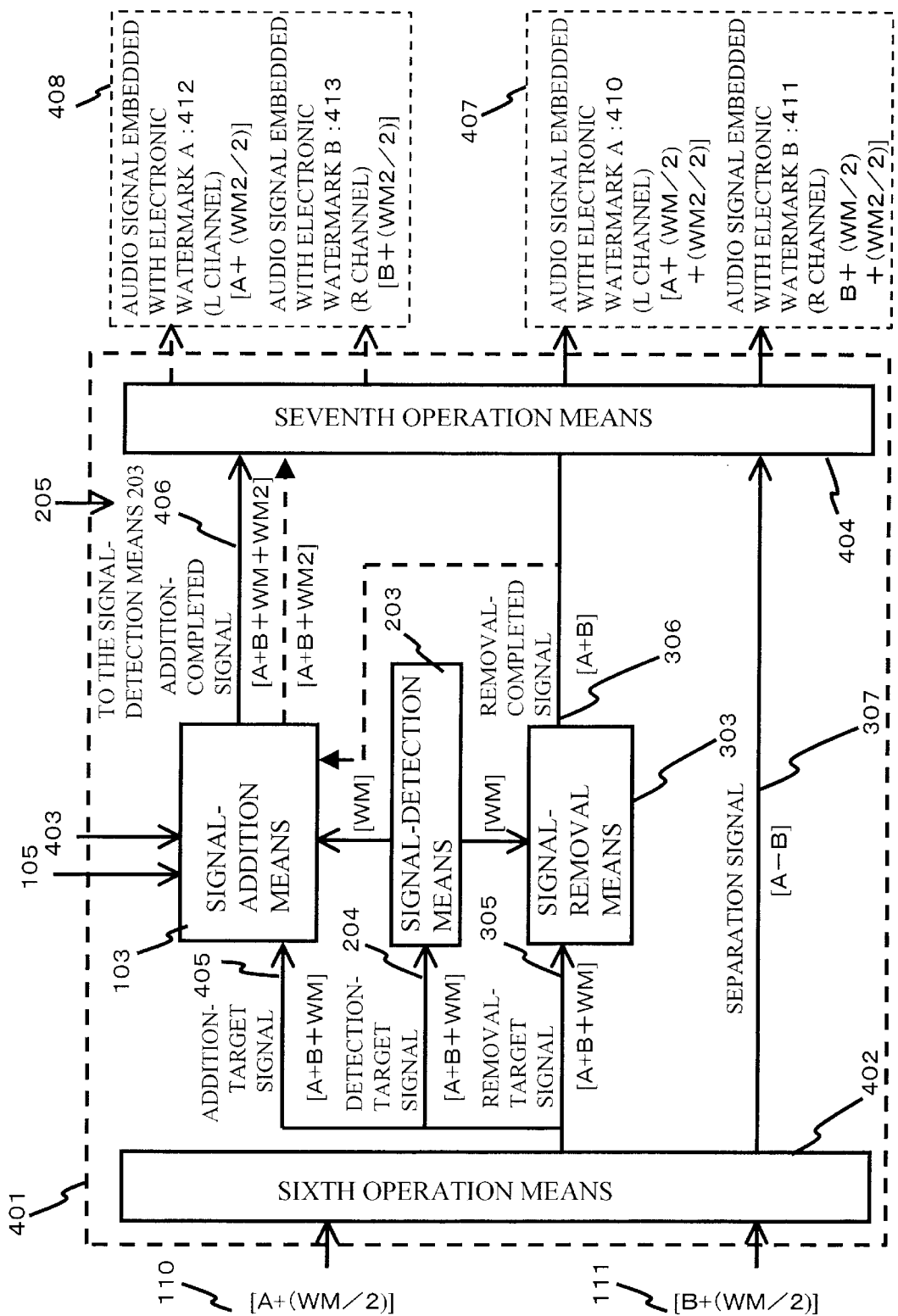
FIG. 4 is a block diagram showing a summary of the function of the data-update apparatus.

Next, a second embodiment of the invention will be explained using FIG. 4. Shown in FIG. 4 is a data-update apparatus that is used for updating an addition signal contained in audio contents embedded with an electronic watermark, or in other words, it is used for updating the electronic watermark when reproducing or copying audio contents embedded with an electronic watermark. The data-update apparatus 401 of this second embodiment comprises a signal-addition means 103 that is added to the data-removal apparatus 301 of the first embodiment, so only the points that differ from the first embodiment will be explained here.

For better understanding, an example of updating the data added to audio contents from 'Copy One Generation' to 'No More Copies' will be given. In other words, the addition data (WM), to be described later, includes data indicating 'Copy One Generation'.

First, when the audio signals A 110, B 111 embedded with an electronic watermark are input to the data-update apparatus 401, they are input to a sixth operation means 402. Here, subtracting the audio signal B 111 from the audio signal A 110 (or the audio signal A 110 from the audio signal B 111) and outputting a separation signal 307 is the same as that described for the first embodiment. Also, adding the two audio signals A 110, B 111, outputting a detection-target signal 204 (removal-target signal 305) (A+B+WM) and inputting those signals to the detection means 203 and signal-removal means 303 is also the same as described above. Furthermore, the added signals are input to the signal-addition means 103 as the addition-target signal 405. The signal-addition means is the same as the signal-addition means of the first embodiment.

Next, the signal-detection means 203 detects the addition signal (WM) from the detection-target signal 204 and sends the addition signal 114 to the signal-addition means 103. Here, the addition signal contains the data 'Copy One Generation', so, based on that data, the signal-addition means 103 adds an addition signal 403 (WM2) to the addition-target signal 405 (A+B+WM) containing the data 'No More Copies'. When doing this, the signal addition means 103 adds the addition signal 403 using a third key 409 when necessary.

The addition-target signal 405 to which the addition signal 403 (WM2) has been added is output as an addition-completed signal 406 (A+B+WM+WM2).

Next, the addition-completed signal 406 and separation signal 307 are input to a seventh operation means 404, and the seventh operation means adds the addition-completed signal 406 and separation signal 307 and divides the result by two, then outputs an audio signal A 410 (A+(WM/2)+(WM2/2)) embedded with an electronic watermark.

Also, the seventh operation means 404 subtracts the separation signal 307 from the addition-completed signal 406 and divides the result by two, then outputs an audio signal B 411 (B+(WM/2)+(WM2/2)) embedded with an electronic watermark.

In this way, addition data 403 (WM2) having data indicating 'No More Copies' is further added to the input audio signals A 110, B 111 embedded with an electronic watermark and the result is output as audio contents 407 embedded with an electronic watermark.

In the processing described above, both the addition signal (WM) and addition signal 403 (WM2) are included with the output audio signals A 410, B 411 embedded with an electronic watermark, so there is a possibility that further processing may become complicated. In order to prevent such a problem, first the signal-removal means 303 subtracts the addition signal (WM) that was output by the signal-detection means 203 from the removal-target signal 305, to obtain a removal-completed signal 306 (A+B). Next, the removal-completed signal 306 is input to the signal-addition means 103, and the signal-addition means 103 adds the addition signal 403 (WM2) to the removal-completed signal 306. By doing this, the signal output from the signal-addition means 103 becomes the addition-completed signal 406' (A+B+WM2).

Then the seventh operation means 404 performs the same addition, subtraction and division operations as described above and outputs an audio signal A 412 (A+(WM2/2)) embedded with an electronic watermark and an audio signal B 413 (B+(WM2/2)) embedded with an electronic watermark, or in other words outputs audio contents 408 embedded with an electronic watermark.

As described above, by comprising a sixth operation means, seventh operation means, signal-detection means, signal-addition means, and when necessary, a signal-removal means, it is possible for the data-update apparatus to greatly reduce the amount of operations required for updating the addition signal.

(Embodiment 3)

Next, a third embodiment of the invention will be explained. For the first and second embodiments, processing when the audio contents comprised two channels was described, however, in this third embodiment, examples of the operation performed by each of the operation means on the audio signals from a plurality of channels will be given.

EXAMPLE 1

Figure 6:
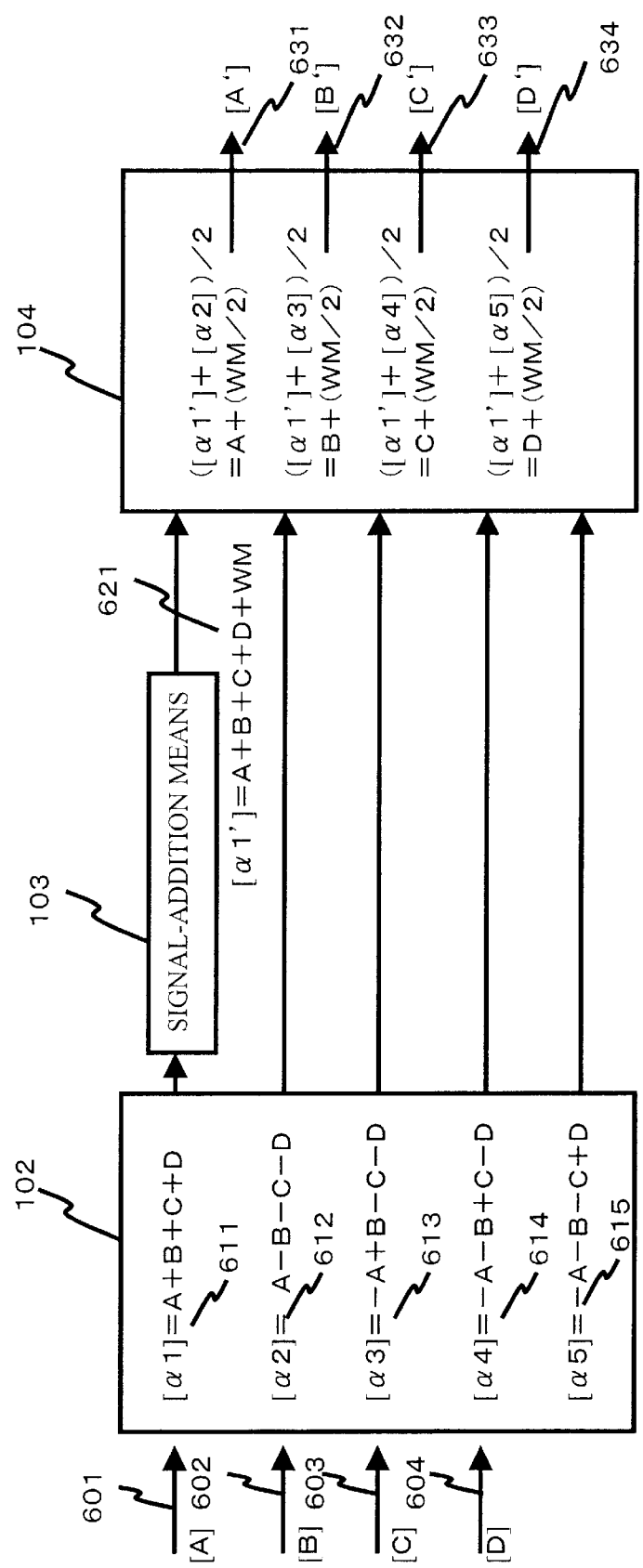
FIG. 6 is a first drawing showing the operation processes of each operation means when there are four kinds of input audio signals.

First, the processing for each operation means will be explained for the case when there are four kinds of input audio signals (4-channel input) as shown in FIG. 6.

When audio signals A 601 to D 604 are input to the first operation means 102 of the data-addition apparatus 101 that was described for the first embodiment, operations $\alpha 1$ (611) to $\alpha 5$ (615) are performed. These operations are:

$\alpha 1(611) = A+B+C+D$ $\alpha 2(612) = A-B-C-D$ $\alpha 3(613) = -A+B-C-D$ $\alpha 4(614) = -A-B+C-D$ $\alpha 5(615) = -A-B-C+D$ Here, when the signal-addition means 103 adds the addition signal (WM) to $\alpha 1$ (611), for example, the addition-completed signal 115 that is output from the signal-addition means 103 becomes $\alpha 1'$ (621)=A+B+C +D+WM.

$\alpha 2$ (612) to $\alpha 5$ (615) are used as the separation signals 113.

Next, when $\alpha 1'$ (621) and $\alpha 2$ (612) to $\alpha 5$ (615) are input to the second operation means 104 of the data-addition apparatus 101 the four operations ($\alpha 1'(621)+\alpha 2(612)$)=A+(WM/2) . . . A'

($\alpha 1'(621)+\alpha 3(613)$)=B+(WM/2) . . . B'

($\alpha 1'(621)+\alpha 4(614)$)=C+(WM/2) . . . C'

($\alpha 1'(621)+\alpha 5(615)$)=D+(WM/2) . . . D' are performed to obtain the output A' (631) to D' (634).

The output signals described above are the audio signals A (601) to D (604) input to the signal-addition means 101 to which the addition signal (WM) has been added. However, the level (signal intensity) of the addition signal (WM) is halved during addition.

In the processing above, the amount of operations needed for adding the addition signal becomes ¼ that of the prior technology.

Figure 7:
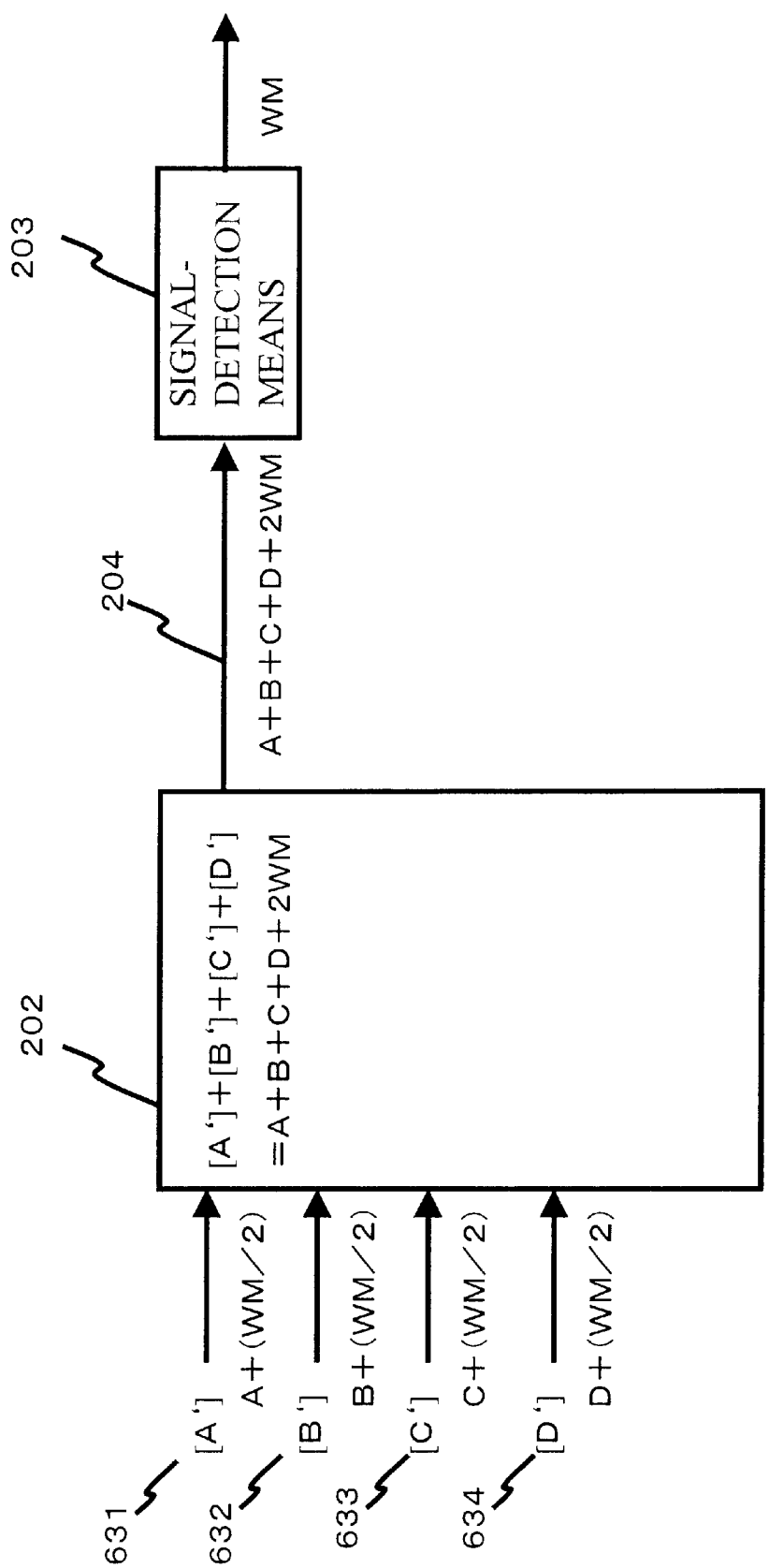
FIG. 7 is a second drawing showing the operation processes of each operation means when there are four kinds of input audio signals.

Next, as shown in FIG. 7, when the four input audio signals A' (631) to D' (634) are received by the data-detection apparatus 201, the third operation means 202 adds all four signals, and outputs the detection-target signal 204.

$A'(631)+B'(632)+C'(633)+D'(634) = A+B+C+D+ 2WM$ . . . Detection-target signal 204

Next, the detection-target signal 204 that is output from the third operation means 202 is input to the signal-detection means 203, and the signal-detection means 203 uses a second key, for example, to detect (extract) the addition signal (WM).

In this process, the amount of operations needed for detecting the addition signal is ¼ that of the prior technology.

EXAMPLE 2

Figure 8:
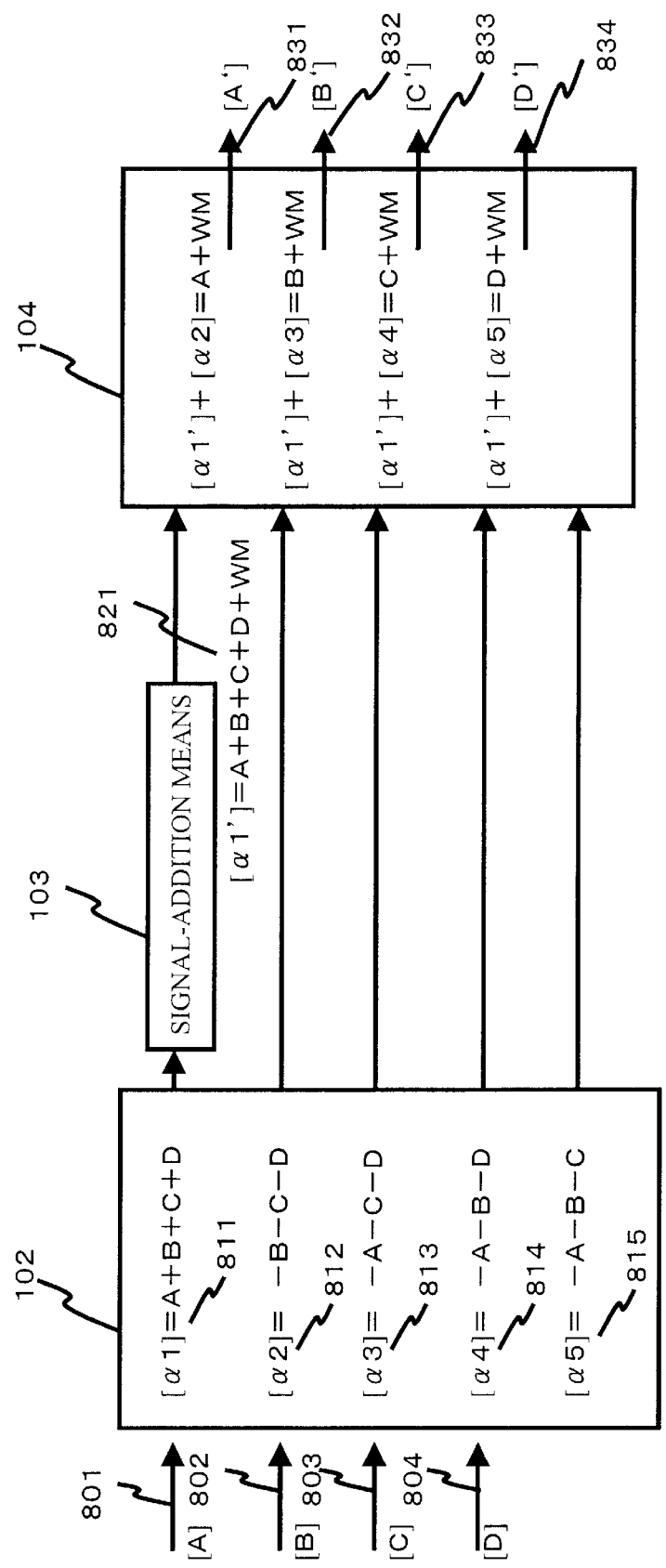
FIG. 8 is a third drawing showing the operation processes of each operation means when there are four kinds of input audio signals.

Next, the processing performed by each operation means will be explained for when there are four kinds of input audio signals (4-channel input) as shown in FIG. 8. The 4-channel audio signal is the same as in the Example 1, however, the operations of each of the operation means are different.

First, when the audio signals A 801 to D 804 are input to the first operation means of the data-addition apparatus 101 described in the first embodiment, operations $\alpha 1$ (811) to $\alpha 5$ (811) are performed. These operations are:

$\alpha 1(811) = A+B+C+D$ $\alpha 2(812) = -B-C-D$ $\alpha 3(813) = -A-C-D$ $\alpha 4(814) = -A-B-D$ $\alpha 5(815) = -A-B-C$ Here, when the signal-addition means 103 adds the addition signal (WM) to $\alpha 1$ (811), for example, the addition-completed signal 115 that is output from the signal-addition means 103 becomes $\alpha 1'$ (821)=A+B+C+D+WM. $\alpha 2$ (812) to $\alpha 5$ (815) are used as the separation signals 113 the same as in Example 1.

Next, when $\alpha 1'$ (821) and $\alpha 2$ (812) to $\alpha 5$ (815) are input to the second operation means 104 of the data-addition apparatus 101 the four operations ($\alpha 1'(821)+\alpha 2(812)$)=A+WM . . . A'

($\alpha 1'(821)+\alpha 3(813)$)=B+WM . . . B'

($\alpha 1'(821)+\alpha 4(814)$)=C+WM . . . C'

($\alpha 1'(821)+\alpha 5(815)$)=D+WM . . . D' are performed to obtain the output A' (831) to D' (834).

The output signals described above are the audio signals A (801) to D (804) input to the signal-addition means 101 to which the addition signal (WM) has been added.

In the processing described above, the amount of operations needed for adding the addition signal is ¼ that of the prior technology.

Figure 9:
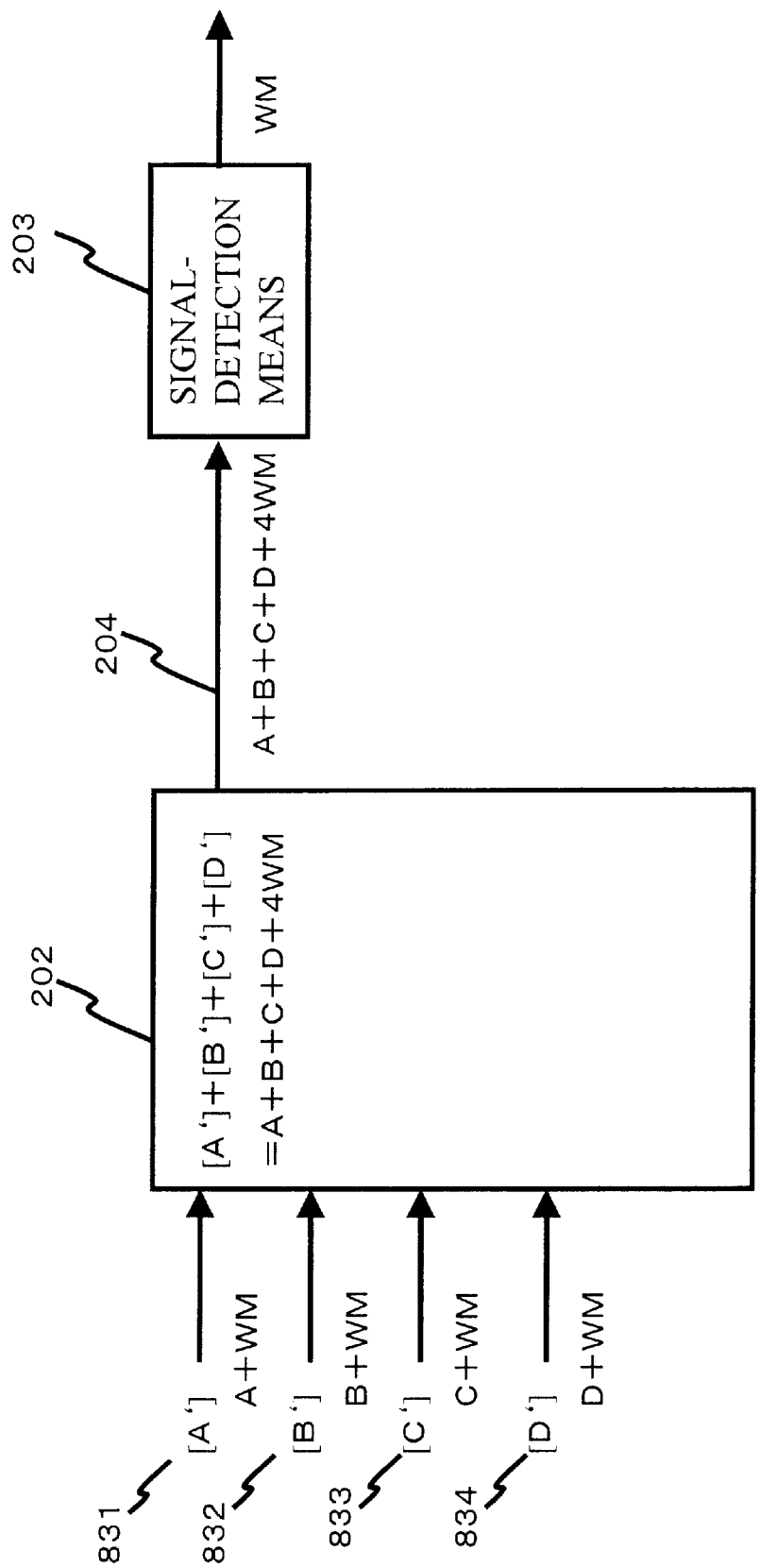
FIG. 9 is a fourth drawing showing the operation processes of each operation means when there are four kinds of input audio signals.

Next, as shown in FIG. 9, when the four output audio signals A' (831) to D' (834) are received by the data-detection apparatus 201, the third operation means 202 adds all four of the signals and outputs a detection-target signal 204.

$A'(831)+B'(832)+C'(833)+D'(834) = A+B+C+D+ 4WM$ . . . Detection-target signal 204

Next, the detection-target signal 204 that is output from the third operation means 202 is input to the signal-detection means 203, and the signal-detection means 203 uses a second key, for example, to detect (extract) the addition signal (WM).

In this process as well, the amount of operations needed for detecting the addition signal is ¼ that of the prior technology.

Furthermore, similar to the case when four audio signals are input, in the case when six audio signals or even more audio signals are input, this method can be adapted by simply changing the operation method of each operation means a little.

There are various operation methods that can be used by each of the operation means, so the operation methods used by each of the operation means are not limited.

Furthermore, when six audio signals are input, for example, it is possible to add the addition signal to only five of the six audio signals. In this case, the processing described in embodiments 1 to 3 is performed for just the five audio signals, and the remaining audio signal can be input and output as is without becoming a target of the operations of the operation means.

(Embodiment 4)

Figure 10:
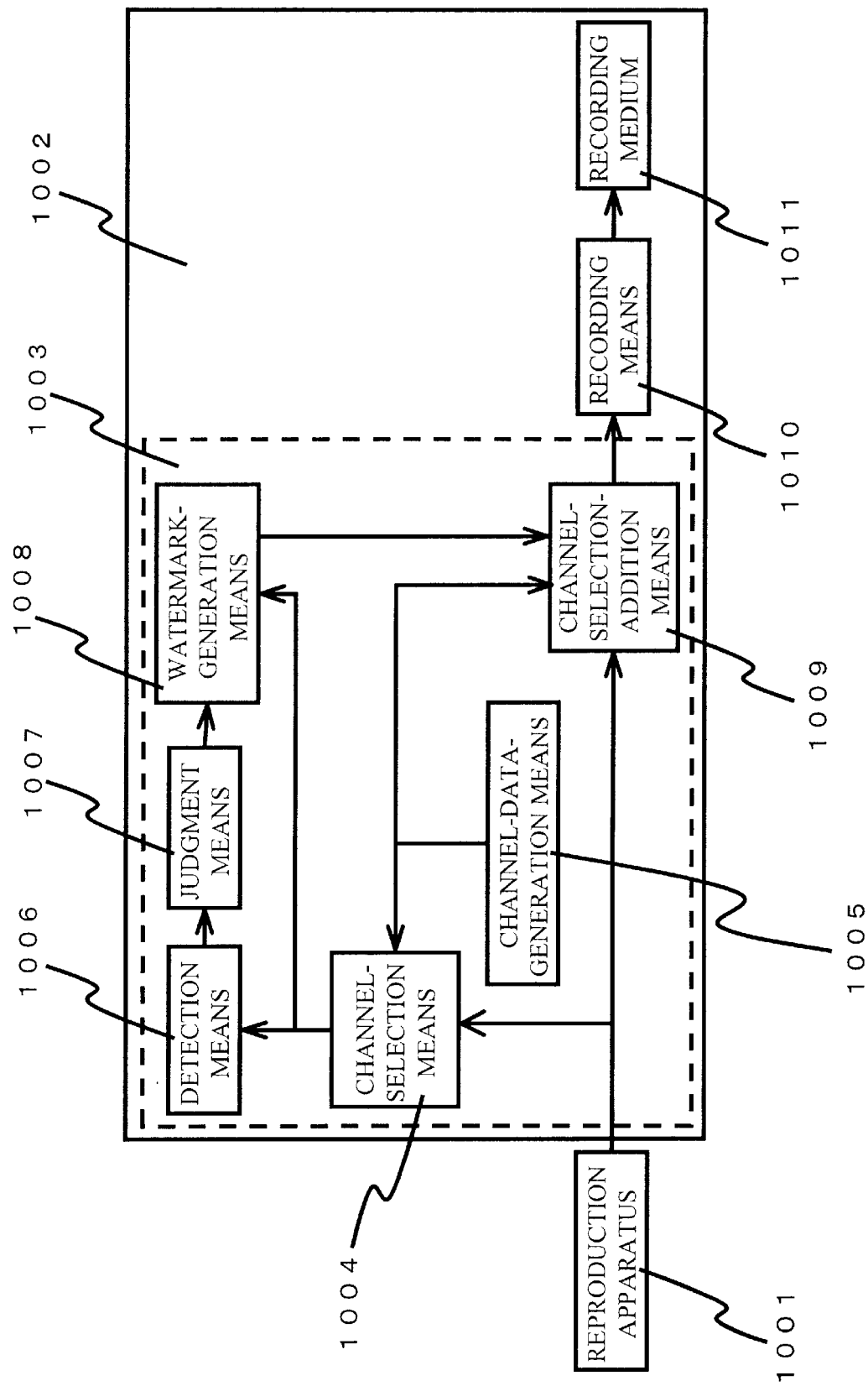
FIG. 10 is a block diagram showing the data-update apparatus and recording apparatus of a fourth embodiment of the invention.

Next, a fourth embodiment of the invention will be explained using FIG. 10 to FIG. 12. In this embodiment, a technique that differs from that of using the sums and differences of signals, as was done in the first through third embodiments, is explained.

An audio signal embedded with an electronic watermark is reproduced by a reproduction apparatus 1001 and input to a recording apparatus 1002 equipped with a data-update apparatus 1003 (electronic watermark update apparatus), then it is recorded onto a recording medium 1011, such as DVD-RAM, by a recording means 1010.

In the data-update apparatus 1003, first, a channel-selection means 1004 obtains the audio signal of a certain channel from the audio signal that is input to the recording apparatus 1002, and a detection means 1006 detects the electronic watermark in the obtained audio signal. In the channel-selection means 1004, which channel to select is specified by a channel-data-generation means 1005. The channel that is specified by the channel-data-generation means 1005 can be any channel selected at random from the audio signal that is input from the reproduction apparatus 1001, or it is possible to specify a channel in order of being sent. In the case of the channel being selected at random as well as in the case of being specified in the order of being sent, when there is a special low-bandwidth channel, the channel can be selected at random or be specified in the order of being sent from the channels excluding the special low-bandwidth channel. However, the method of selecting a channel is not limited to this.

Next, the channel-data-generation means 1005 sends the same data as sent to the channel-selection means 1004 to the channel-selection-addition means 1009. The operation of the channel-selection-addition means 1009 will be described later.

The detection means 1006 detects the electronic watermark from the input audio signal and sends the result to a judgment means 1007. In the case that an electronic watermark was not detected here, the fact that a watermark could not be detected can be output as the result. When the judgment means 1007 determines, for example, that the result detected by the detection means 1006 was 'Copy One Generation', it outputs an instruction to a watermark-generation means 1008 to update the watermark.

When the watermark-generation means 1008 receives the update instruction from the judgment means 1007, it generates data for an electronic watermark signal indicating 'No More Copies' and outputs the signal to the channel-selection-addition means 1009. Here, the audio signal that was selected by the channel-selection means 1004 is input to the watermark-generation means 1008. When the watermark-generation means 1008 generates an electronic watermark, it analyzes this audio signal to find the masking level, then generates a watermark signal that will not affect hearing the audio signal. All of the channels of the audio signal that are input to the recording apparatus 1002 from the reproduction apparatus 1001 are input to the channel-selection-addition means 1009, and it adds the update electronic watermark signal that was generated by the watermark-generation means 1008 to the channel that was specified by the channel-data-generation means 1005, and outputs the audio signals of all of the channels. The recording means 1010 receives the audio signal with the updated electronic watermark and records the audio signal onto the recording medium 1011.

Here the operation of the detection means 1006, judgment means 1007 and watermark-generation means 1008 will be explained in further detail. It is not shown in FIG. 10, however, the detection means 1006, judgment means 1007 and watermark-generation means 1008 are each connected to a control unit such as a host CPU that controls the operation of the recording apparatus 1002, and they are controlled by the control unit.

Figure 11:
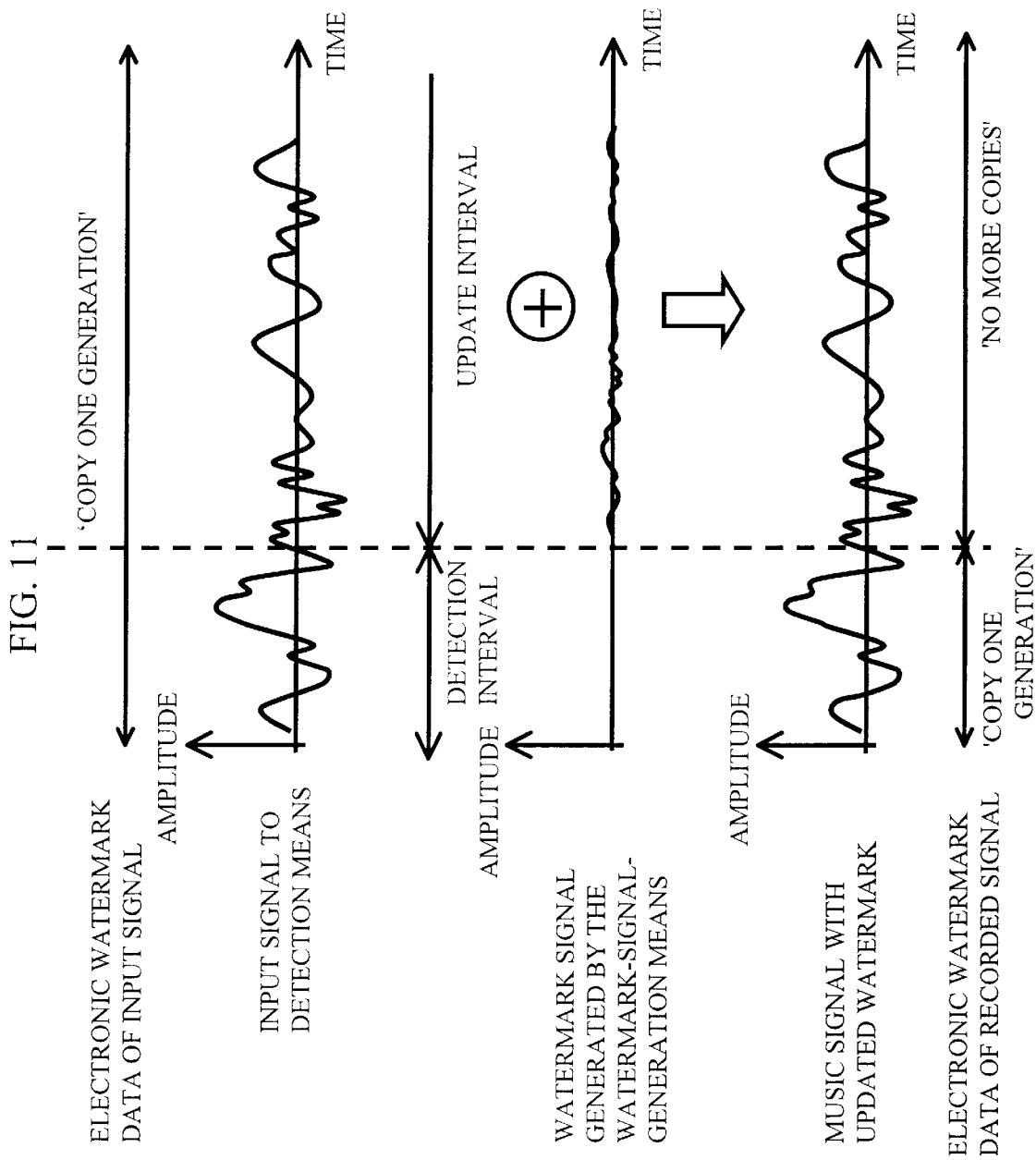
FIG. 11 is a drawing giving a summary of the audio signal and update watermark signal of a fourth embodiment of the invention.

FIG. 11 shows the input signal of the detection means 1006, the output signal of the watermark-generation means 1008 and the audio signal of the channel with the watermark that was updated by the channel-selection-addition means 1009. First, when the audio signal is input to the detection means 1006, the detection means 1006 detects the electronic watermark. It takes a certain amount of time, for example 15 seconds, for the detection mean 1006 to detect the electronic watermark. This amount of time will be called the detection interval. In the first detection interval after the audio signal is input to the detection means 1006, it is not clear what the copyright control data of the electronic watermark embedded in the audio signal is, so the watermark-generation means 1008 does not generate an update watermark and the output of the watermark-generation means 1008 has no sound.

Next, the electronic watermark is detected by the detection means 1006, and when it is determined by the judgment means 1007 that the watermark needs to be updated, the watermark-generation means 1008 begins to generate an update watermark signal. After that, the watermark-generation means 1008 continues to generate the update watermark signal, so the audio signal that is input to the recording apparatus 1002 is recorded onto the recording medium 1011 while the electronic watermark for the channel is being updated.

As described above, the watermark is not updated after detecting all of the electronic watermarks embedded in music, but through control of the control unit, only one watermark is detected, and when that electronic watermark must be updated, the electronic watermarks of the audio signal after that are updated, thus real-time processing is possible.

Also, after updating of the electronic watermark begins, operation of the detection means 1006 can be stopped. By stopping operation of the detection means 1006, it is possible to reduce the amount of power consumed by the recording means 1020.

Moreover, in this fourth embodiment, as long as the detection means 1006 and watermark-generation means 1008 do no operate simultaneously, it is possible to construct the detection means 1006 and watermark-generation means 1008 using LSI micro code, and by switching operation on the same LSI, it is possible to reduce the size of the LSI.

If the user of the recording apparatus knows that the detection means 1006 detects the electronic watermark only one time at the beginning of music, it is possible to avoid the watermark even though a watermark 'No More Copies' is embedded in the music. In other words, by inputting the audio signal to the recording apparatus after adding a section of no sound that is longer than the detection interval at the start of music, there is a danger of the user going around the detection by the detection means 1006 and making an illegal copy.

Figure 12:
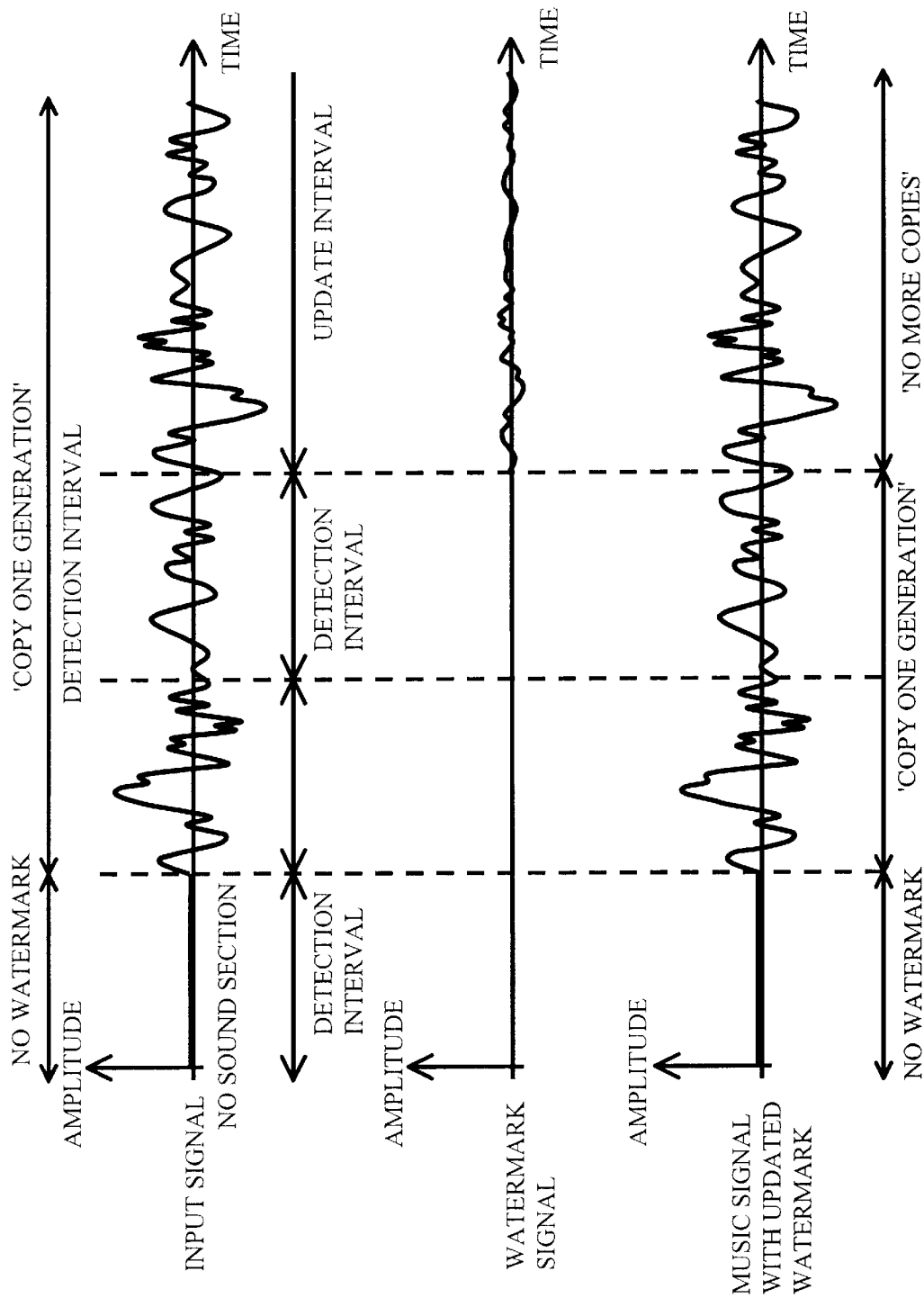
FIG. 12 is a drawing giving a summary of the audio signal and update watermark signal of a fourth embodiment of the invention.

On the other hand, as shown in FIG. 12, the detection means 1006 does not perform detection only one time, and in addition to the beginning of the music, the detection means 1006 selects detection intervals at random within the music, and detects the electronic watermark of the input audio signal, and by comparing it with the detected electronic watermark at the beginning of the music to determine whether they match, it is possible to discern this kind of avoidance behavior. It is also possible to perform control such that searching continues until an electronic watermark that needs updating is detected, and then as soon as that kind of electronic watermark is detected, operation of the watermark-generation means 1008 starts.

The audio signal described above is not limited to a sound signal, and can include any kind of acoustical signal such as music, voice, etc.

Also, in the explanation of this fourth embodiment, transmission of the signals from one operation means to another operation means was performed by direct transmission, however, it is also possible to transfer data via a host CPU that controls the entire recording apparatus 1002 or data-update apparatus 1003. For example, the amount of data transferred from the detection means 1006 to the judgment means 1007 is small, and the transmission speed does not need to be especially fast. Therefore, it is possible for the detection means 1006 to send the detection result to the host CPU and then for the host CPU to send that detection result to the judgment means 1007, or to have the host CPU perform judgment of whether or not the electronic watermark needs updating using software or hardware in the host CPU and then output an instruction to the watermark-generation means 1008 to update the watermark. In the case of the latter example, the judgment means 1007 is no longer necessary.

In this fourth embodiment, there is a channel-selection means 1004, channel-data-generation means 1005 and channel-selection-addition means 1009, however, in the case that the audio signal input to the recording apparatus 1002 is limited to a 1-channel monaural signal, there is no need to select a channel, so these operation means can be omitted.

Moreover, with this invention, the electronic watermark of the audio signal is not updated while the detection means 1006 is operating, so the electronic watermark of part of each music that is recorded on the recording medium 1011 is not updated. As was explained above, when a recorded music is input to the recording apparatus 1002 again, the detection means 1006 continues to search until it detects an electronic watermark that needs to be updated, or by performing watermark detection at the beginning of the music and at least one or two more locations that are selected at random, it is possible to prevent recording music beyond a watermark indicating 'No More Copies'.

Also, the reproduction apparatus 1001 is not limited to an apparatus that reproduces physical media such as a DVD audio player, but can be an apparatus that reproduces a file stored on a computer hard disk, or an apparatus that reproduces data that are distributed over a network such as the Internet.

The watermark-generation means can also be called an update-data-generation means.

(Embodiment 5)

Figure 13:
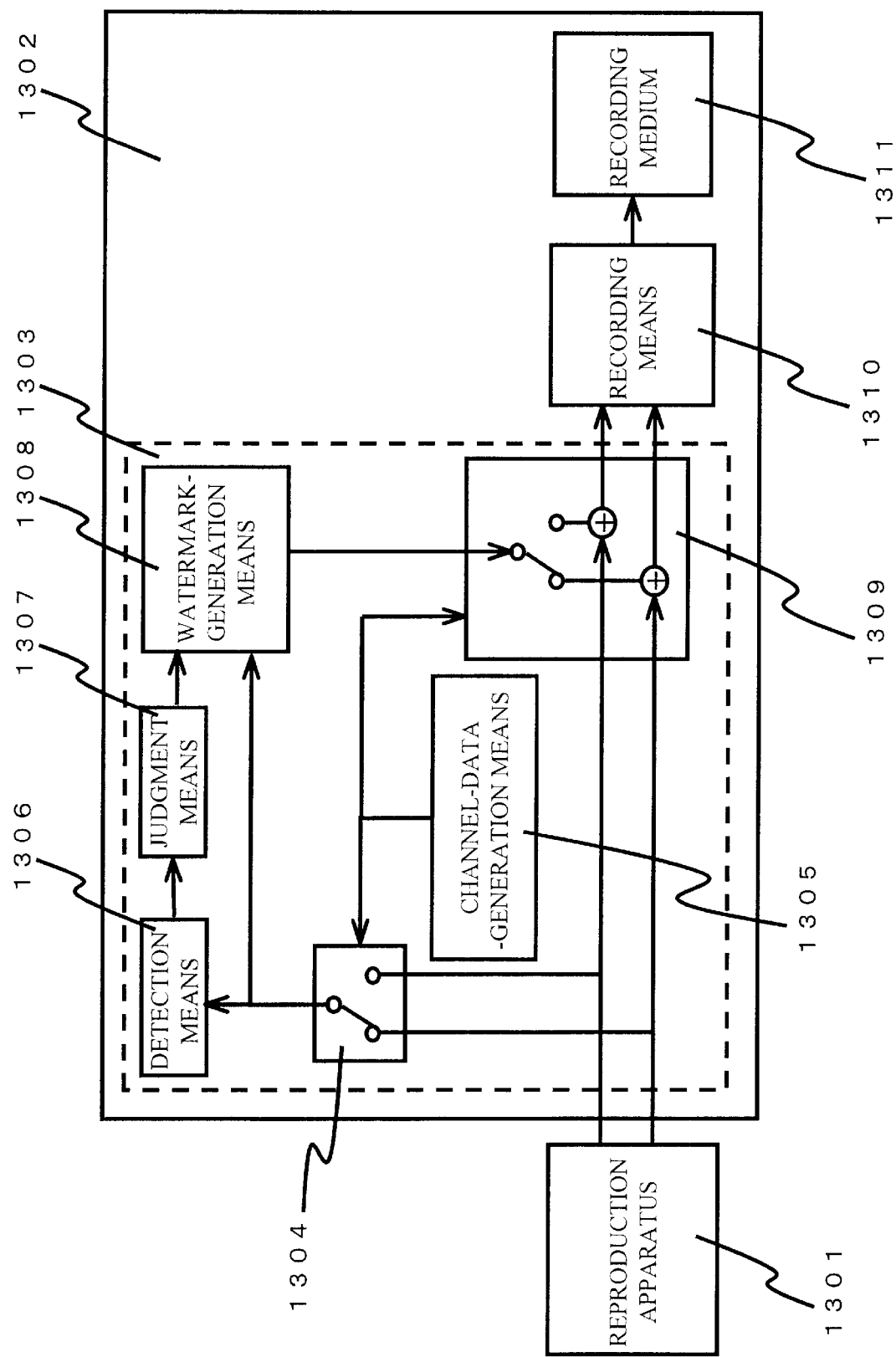
FIG. 13 is a block diagram showing the data-update apparatus and recording apparatus of a fifth embodiment of the invention.
Figure 14:
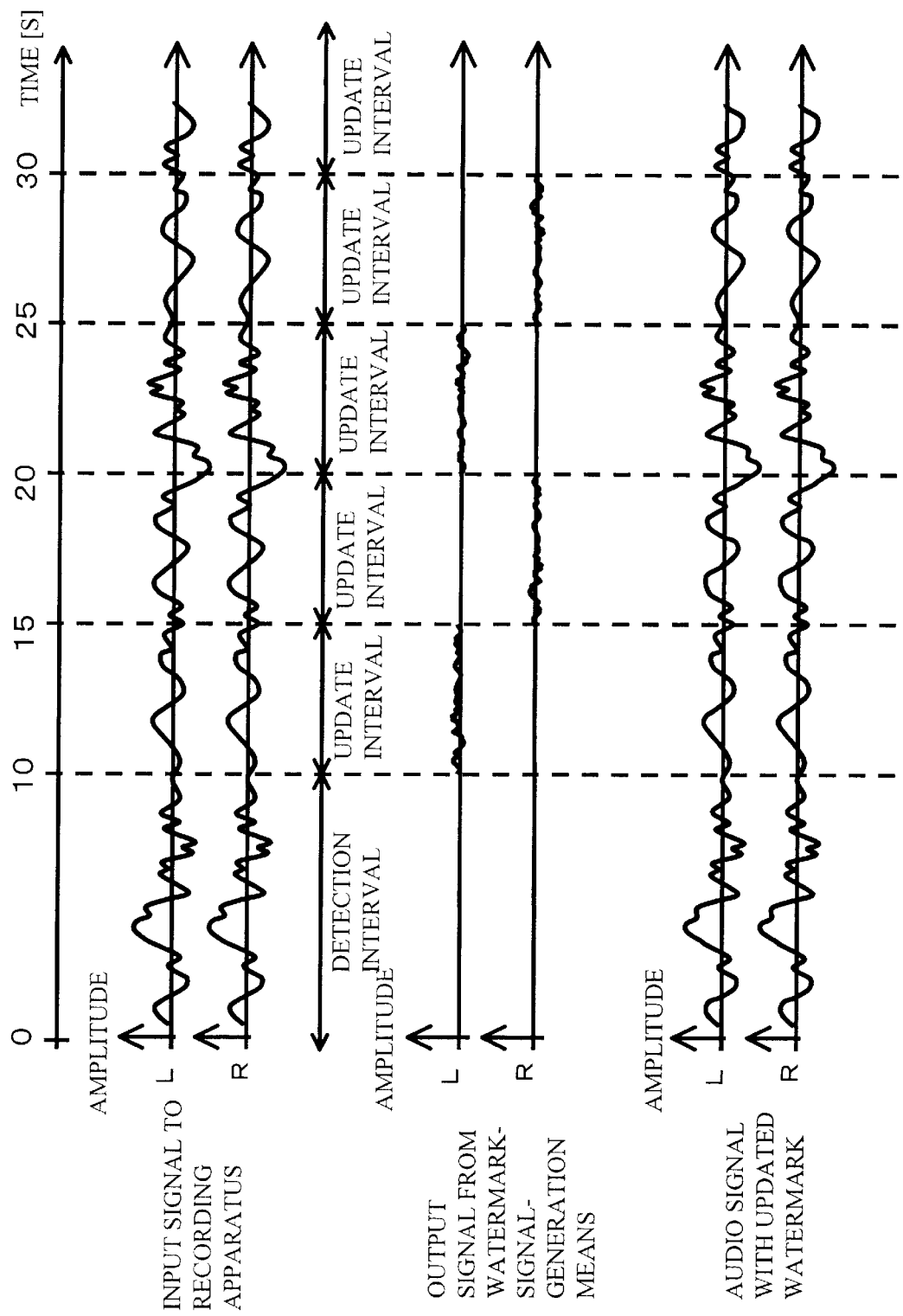
FIG. 14 is a drawing giving a summary of the audio signal and update watermark signal of a fifth embodiment of the invention.

Next, a fifth embodiment of the invention will be explained using FIG. 13 and FIG. 14. FIG. 13 is nearly the same as FIG. 10 that explains the fourth embodiment, however, it is different in that the audio signal that is input to the recording apparatus 1302 from the reproduction apparatus 1301 is a 2-channel stereo signal, and there is a switch in the channel-selection means 1304 and there is a switch and addition means in the channel-selection-addition means 1309.

As was explained when describing the problems this invention is trying to solve, in the current electronic watermarking technology that is generally used, watermarks are embedded in each channel, and to update the watermarks, the electronic watermark for each channel must be updated. In other words, in the case of a 2-channel audio signal, in order to update the electronic watermark, it is necessary to perform twice the amount of operations than for a 1-channel audio signal, and in the case of DVD audio, in order to update the electronic watermarks embedded in all of the channels except the special low-bandwidth LFE channel, or in other words in order to update the electronic watermarks embedded in the 5 channels, it is necessary to perform five times the amount of operations than for a 1-channel contents.

Therefore, in this fifth embodiment, the channel-selection means 1304 selects the channel that was specified by the channel-data-generation means 1405 and sends the audio signal of that selected signal to the detection means 1306. The detection means 1306 detects the electronic watermark that is embedded in the audio signal and sends it to the judgment means 1307. The judgment means 1307 determines whether or not it is necessary to update the detected electronic watermark, and when it is necessary, the judgment means 1307 sends an update instruction to the watermark-generation means 1308. The watermark-generation means 1308 generates and outputs a watermark signal for updating the electronic watermark.

When doing this, the watermark-generation means 1308 uses the audio signal of the channel selected by the channel-selection means 1304, and generates a watermark that cannot be detected by human hearing. The generated watermark signal is then input to the channel-selection-addition means 1309, where it is added to the audio signal of the channel that was used for generating the watermark signal, then it is output to the recording means 1310. The recording means 1310 records the audio signal with updated electronic watermark onto a recording medium 1311.

In this fifth embodiment, the procedure used by the data-update apparatus 1303 for updating the electronic watermark is nearly the same as in the first embodiment, however, it differs in that after it has been determined that the electronic watermark is to be updated, the channel-data-generation means 1305 specifies a switching channel in an interval that is half or less than that during detection. This will be explained using FIG. 14. First, the signal input to the recording apparatus 1302 is a 2-channel stereo signal having an L channel and R channel. The switching interval for switching the channel when updating the electronic watermark is called the update interval. Moreover, at the longest, the detection means 1306 is capable of detecting the electronic watermark in half the time or less than the detection interval.

Therefore, when the detection interval is 10 seconds, for example, the update interval is half the detection time at the longest, or in other words it is 5 seconds. In this way, when an audio signal with an updated electronic watermark recorded on a recording medium 1311 is input to the recording apparatus 1302 again, it is possible for the detection means 1306 to detect the updated electronic watermark in the 10-second detection interval even when the channel-selection means 1304 selects either the L channel or R channel, and thus it is possible to prevent re-copying of the audio signal.

When the audio signal with updated electronic watermark is input again to the recording apparatus 1302, the detection means 1306 can detect both the electronic watermark before updating and the electronic watermark after updating within the 10-second detection interval, however, in this case, the updated electronic watermark has priority when performing control of the recording apparatus 1302.

Also, generally, when the update interval is short, there is a decrease in detection performance of the detection means 1306, so the update interval and detection interval should be set long enough so that detection can be performed sufficiently.

When the number of channels of the audio signal is increased to three channels, similar to the case of two channels, the length of the update interval is set to be ⅓ that of the detection interval, and the channel for which the electronic watermark is to be updated can be switched in order. In this case, as was explained above, the detection means 1306 is capable of detecting the electronic watermark in a time ⅓ or less than the detection interval. The same is also true when increasing the number of channels to four or more.

(Embodiment 6)

Figure 15:
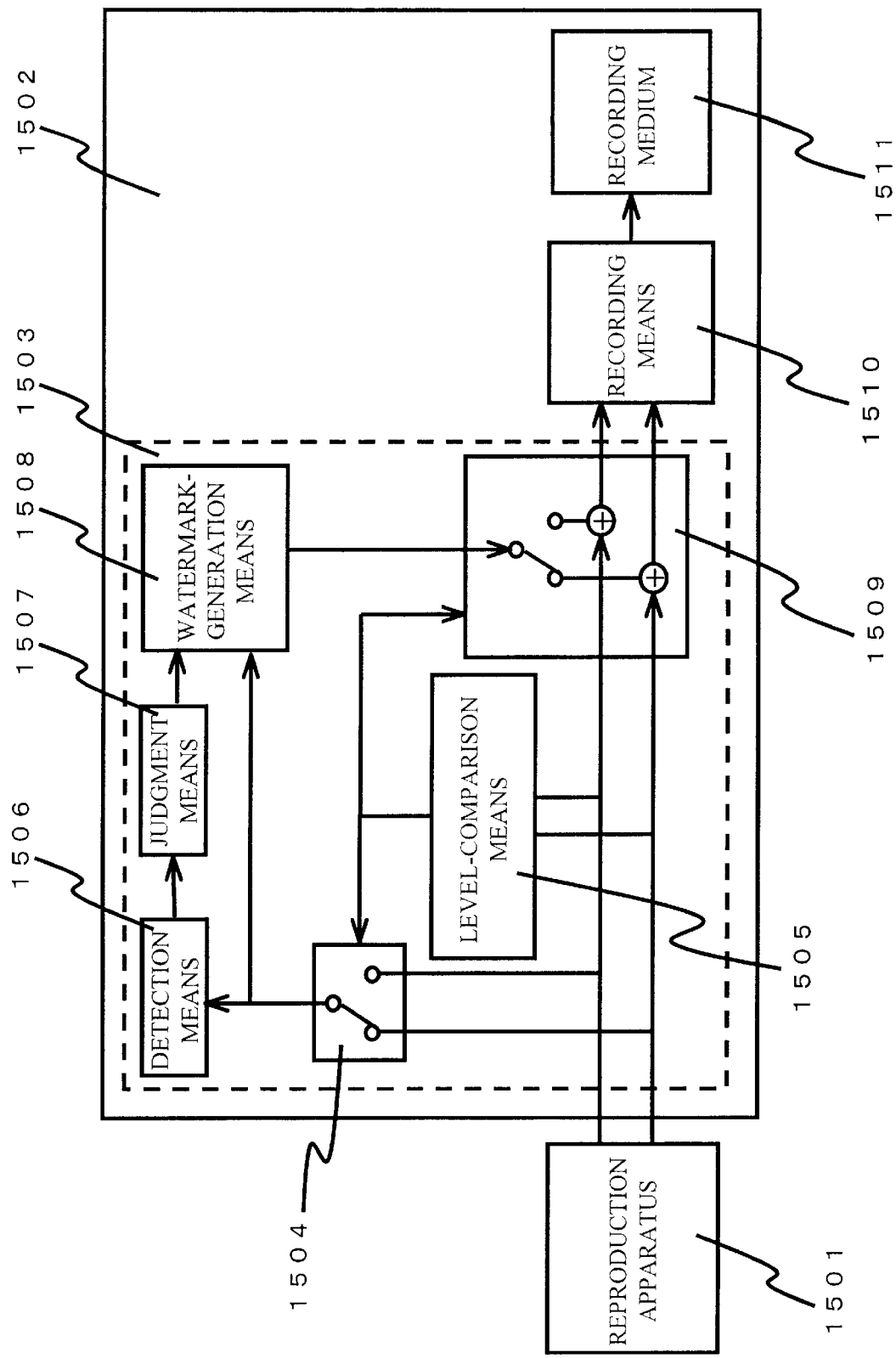
FIG. 15 is a block diagram showing the data-update apparatus and recording apparatus of a sixth embodiment of the invention.

Next, a sixth embodiment will be explained with reference to FIG. 15. This sixth embodiment is nearly the same as the fifth embodiment, however, it differs in that instead of the channel-data-generation means, there is a level-comparison means 1505.

When the audio signal that is input to the recording apparatus 1502 is a multi-channel signal, the amplitude levels of the signals of each of the channels generally differ. Particularly, in the case of signals for surround channels, there is a large difference between the amplitude levels of the two front left and right channels and the other channels. In other words, the amplitude levels of the front middle channel and rear left and right channels are often less than the level of the front left and right channels. Moreover, the amplitude levels of channels other than the front left and right channels are often not uniform over time. That is, depending on the music arrangement, there are times when there is hardly any sound from those channels for several seconds or more.

When the amplitude level of a signal is low, or when there is a period of a few seconds when there is no sound, there is a decrease in the accuracy of detecting the electronic watermark. Also, even when it is possible to detect the electronic watermark, if the amplitude level is low, it is difficult to update the electronic watermark to a level that cannot be heard by human hearing. Moreover, even when the electronic watermark is updated, the watermark is embedded in a signal with a low original amplitude level, so when the audio signal with updated watermark is input to the recording apparatus 1502 again, it is difficult to detect the updated watermark. In this case, even when trying to detect and update the watermark of a channel with a low amplitude level, the reliability of the detection result is low, so a problem occurs in that the overall system of protecting the copyright of the audio signal by updating the electronic watermark may not function well.

Therefore, in this sixth embodiment, the level-comparison means 1505 detects the amplitude level of each channel of the audio signal that is input to the recording apparatus 1502, and sends an instruction to the channel-selection means 1504 to select the channel with the highest amplitude level. In this way, it is possible to maintain the reliability of detecting the electronic watermark by the detection means 1506. Also, when it is determined that the electronic watermark must be updated, the level-comparison means compares the level of each channel of the input audio in the same way as described above when updating is being performed, and updates the electronic watermark of the audio signal of the channel with the highest level.

This makes it possible to sufficiently maintain the reliability of 10 detection by the detection means 1506. Also, by updating the watermark of a channel with a large amplitude level, it is possible for the detection means 1506 to detect the updated watermark and prevent re-copying of the audio signal when the audio signal with updated watermark is input again to the recording apparatus 1502.

The level-comparison means does not always select the channel with the highest amplitude level, but by having an algorithm that selects the channel with the highest amplitude among all of the channels except the currently selected channel, it is possible to avoid continually selecting the same channel over and over again. In this way, when recording the audio signal, a noise signal having a large amplitude is input intentionally for channels other than the front left and right channels for which the main part of the audio signal is recorded, and this makes it possible to prevent behavior of getting around the copyright protection system such as hindering updating of the electronic watermark. Moreover, the same effect can be obtained by having an algorithm that selects the next channel from among all the channels except the current and previous two selected channels. This algorithm can also be an algorithm that selects a new channel based on a log of selected channels.

In this embodiment, as was explained for the fifth embodiment, by setting the detection interval to be the number of channels times longer than the update interval, and then switching the channel at each update interval when updating the watermark, it is also possible to obtain the effect obtained in the fifth embodiment.

(Embodiment 7)

Next, a seventh embodiment of the invention will be explained with reference to FIG. 16. In the seventh embodiment, when an audio signal having two or more channels is input to the recording apparatus 1601, the watermark is updated by generating update watermark signals based on signals that are sums of channels for which it is predicted there will be high correlation, and then adding those watermark signals to the original input signal for each channel. This makes it possible to reduce the amount of operations required in the prior technology in which the watermark had to be detected and an update watermark signal generated separately for each channel.

Figure 16:
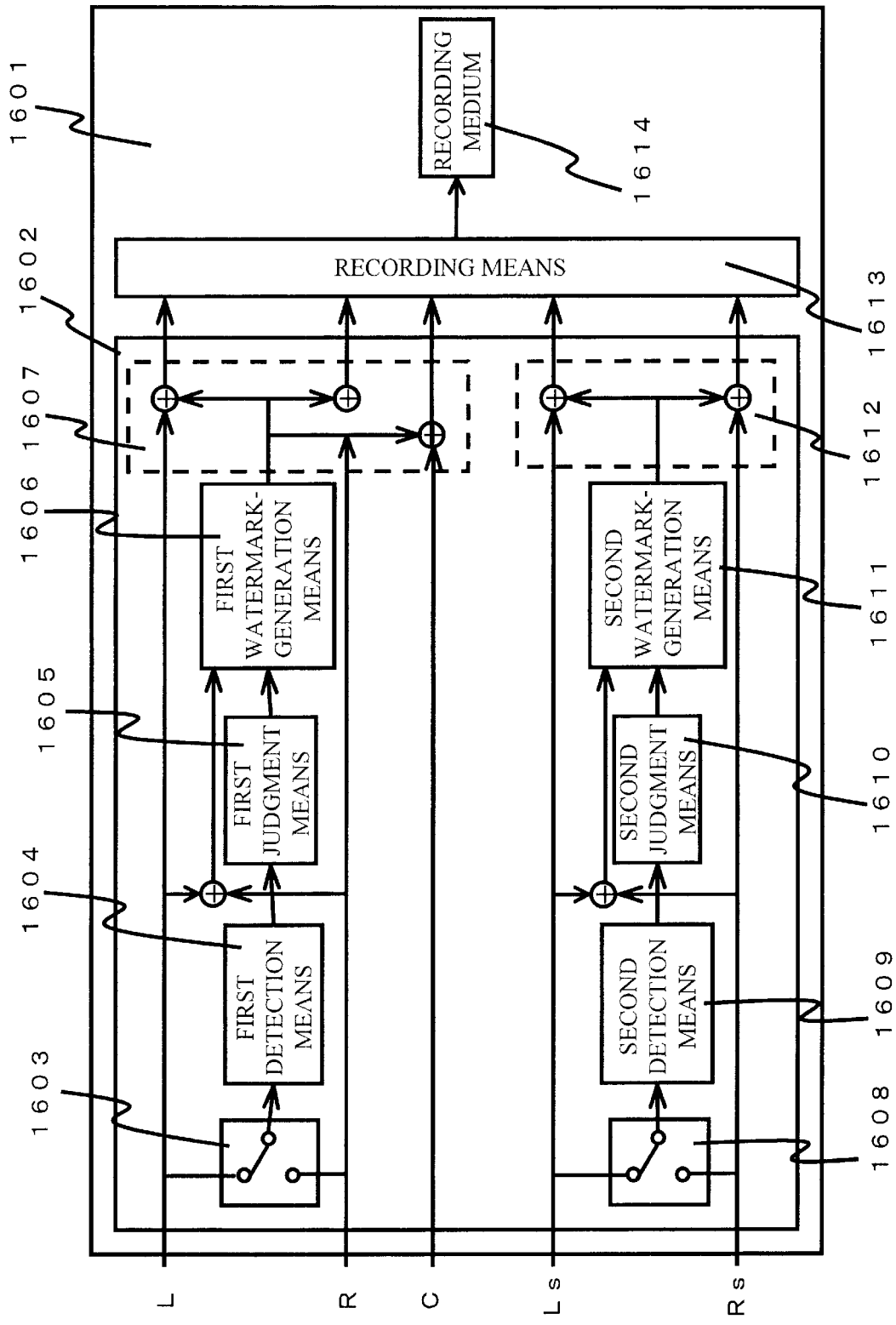
FIG. 16 is a block diagram showing the data-update apparatus and recording apparatus of a seventh embodiment of the invention.

In FIG. 16, a 5-channel audio signal, comprising a front left (hereafter called L) channel, front right (hereafter called R) channel, front center (hereafter called C) channel, rear left (hereafter called Ls) channel and rear right (hereafter called Rs), is input to the recording apparatus 1601.

First, in order to simplify the explanation, the case of inputting the 2-channel contents L and R will be considered. In other words, there is no audio signal input for C, Ls and Rs.

The recording apparatus 1601 comprises an update apparatus 1602 that detects the electronic watermark of the input audio signal and determines whether it is necessary to update the watermark, and when necessary updates the watermark, and a recording means 1613 that records the audio signal with updated watermark onto a recording medium 1614.

When the 2-channel audio signal L and R is input to the recording apparatus 1601, a first channel-selection means 1603 selects one of the audio signals L or R, and sends that audio signal to a first detection means 1604. In FIG. 16, the L channel is selected by the first channel-selection means 1603, however, as was explained for the other embodiments, selecting the channel here can also be performed by using a channel-data-generation means and selecting the channel specified by it, or it is possible to specify the input signal having the highest amplitude level. The selection method is not limited to these methods.

The first detection means 1604 detects the electronic watermark from the input audio signal, and sends the detection result to a first judgment means 1605. When the first judgment means 1605 determines that the electronic watermark detected from the audio signal indicates 'Copy One Generation' and that the audio signal is to be recorded by the recording apparatus, it sends an instruction to the watermark-generation means 1606 to update the electronic watermark. The judgment by this first judgment means 1605, and the instruction to the first watermark-generation means 1606 can also be performed by a control unit as previously described.

The first watermark-generation means 1606 generates a watermark signal based on the audio signal before updating the electronic watermark such that it cannot be heard by human hearing, however, here, it generates an update watermark signal based on a signal added to audio signals L and R.

By adding the generated update watermark signal to both the L and R input signals that are input to the update apparatus 1602, the electronic watermark of the audio signal for each channel is updated.

This seventh embodiment differs from the previous embodiments in that the update watermark signal is generated based on a signal that is the sum of the L and R signals. The waveforms of the signals for the L and R channels generally have very high correlation, so even though the watermark is generated based on a signal that is the sum of the two signals and then added to each channel, it is possible to update the electronic watermark so there is hardly any adverse effect on listening.

In the case that the amplitude of both signals is large and in phase with each other when the L and R audio signals are added, overflow may occur in the operation unit, so when the amplitude is large, it is necessary to perform a processing that will reduce the amplitude by ½, for example, before adding the signals.

Next, the case of inputting an audio signal that includes the Ls and Rs channels in addition to the L and R channels will be considered. When the input signal is classical music or the like, there is high correlation between the Ls and Rs audio signals, and the waveforms and frequency components are similar. Therefore, a second channel-selection means 1608, second detection means 1609, second judgment means 1610 and second watermark-generation means 1611 are used, and as was performed for the L and R channels, the watermark for the input signals Ls and Rs is updated by generating an update watermark based on a signal that is the sum of the Ls and Rs signals and adding that watermark to the input audio signals Ls and Rs.

Next, the case of an audio signal that includes the C channel will be considered. The audio signal for the C channel can be considered to have the following two types of characteristics. The first is when the correlation with the audio signals of other channels, for example the L and R channels, is high, and the other is when the correlation with other audio signals is not high.

As shown in FIG. 16, when the correlation of the audio signal of the C channel with the audio signals of the L and R channels is high, by adding the update watermark that was generated based on the L and R audio signals to the audio signal of the C channel, it is possible to update the watermark such that it cannot be heard by human hearing. Moreover, it is not shown in FIG. 16, however, it is possible to add the input audio signal for the C channel to the input audio signals for the L and R channels and then input that signal to the first watermark-generation means 1606 to generate an update watermark signal that is based on a signal that is the sum of the signals for the L, R and C channels.

On the other hand, when the correlation between the signal of the C channel and the audio signals of the L and R channels is not so high, the update watermark signal is not generated based on the sum of the signals of the L, R and C channels, but as shown in FIG. 16, the electronic watermark for the C channel is updated by adding the update signal that was generated based on the sum of the audio signals of the L and R channels to the audio signal of the C channel. In this way, the same signal that was added to the L and R channels is reproduced from the speaker for the front C channel, however it cannot be heard. Therefore, it is possible to update the watermark in this way.

As was described above, in this embodiment, it is possible to do away with the watermark-generation means that was necessary for each channel in the prior technology, and the watermark can be updated for two or three channels using just one watermark-generation means.

(Embodiment 8)

Figure 17:
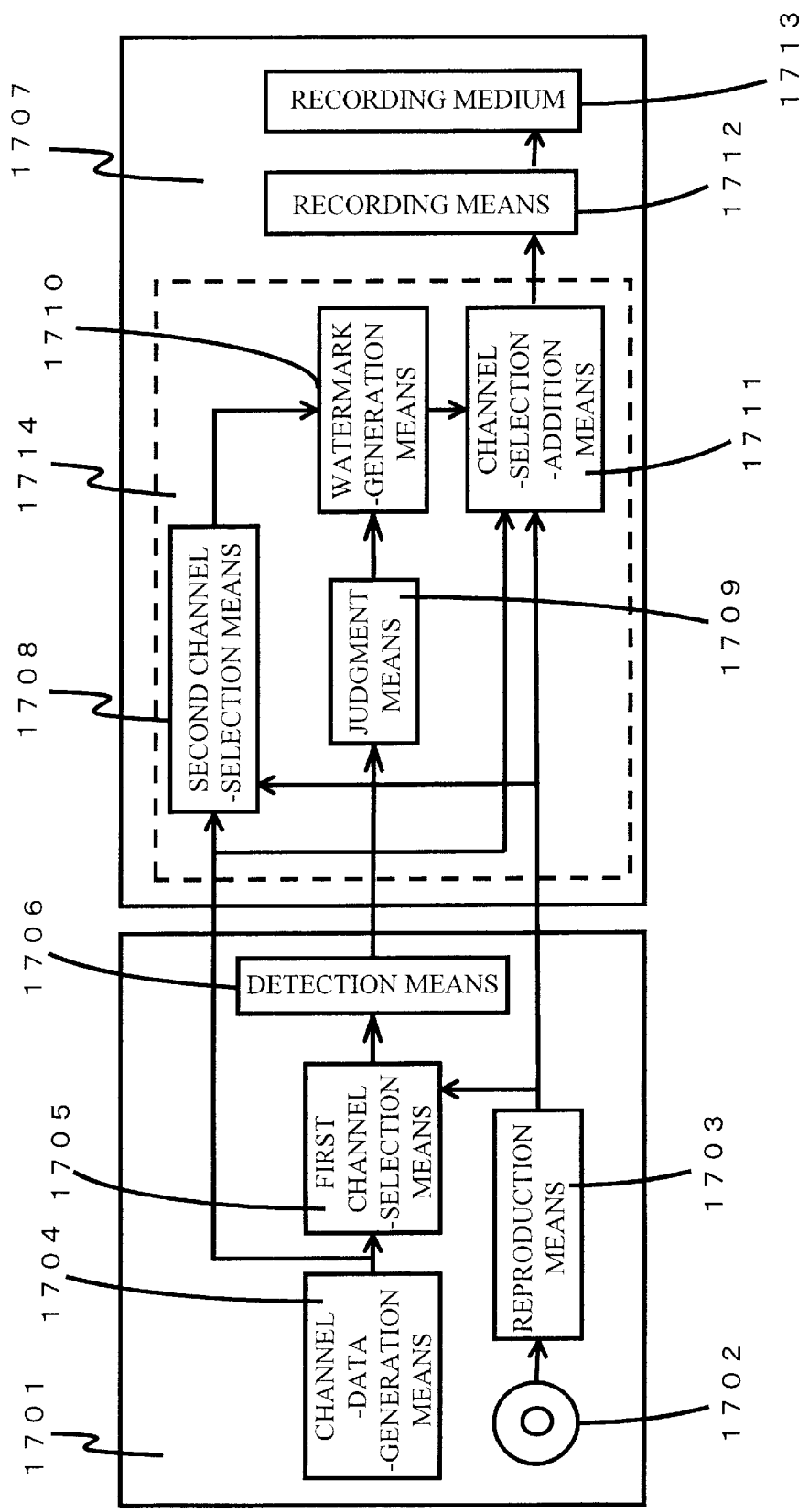
FIG. 17 is a block diagram of the reproduction apparatus and recording apparatus of an eighth embodiment of the invention.

Next, an eighth embodiment will be explained with reference to FIG. 17. This eighth embodiment comprises a reproduction apparatus 1701 that reproduces an audio signal that is recorded on a first recording medium 1702 by a reproduction means 1703, and a recording apparatus 1707 that by way of a recording means 1712 records the audio signal onto a second recording medium 1713.

The first recording medium 1702 is a recording medium such as a DVD audio disc on which an audio signal is recorded. The reproduction means 1703 reads the signal recorded on the first recording medium 1702 and outputs an electric signal as an audio signal from the reproduction apparatus 1701. The audio signal is generally a 2-channel stereo signal or a multi-channel signal that includes a surround channel. The audio signal is input to a first channel-selection means 1705. The first channel-selection means 1705 selects the audio signal of a channel that is specified by a channel-data-generation means 1704, and outputs the signal to a detection means 1706. The detection means 1706 detects the electronic watermark that is embedded in the input audio signal, and sends the result to the recording apparatus 1707 via a transmission means not shown in the figure. Also, the channel data output from the channel-data-generation means 1704 are also sent to the recording apparatus 1707 via the transmission means.

The recording apparatus 1707 comprises: a data-update means, further comprising a judgment means 1709, a watermark-generation means 1710, second channel-selection means 1708 and channel-selection-addition means 1711; and a recording means 1712 that records the audio signal onto a recording medium 1713. The watermark detection result that is sent from the detection means 1706 of the reproduction apparatus 1701 is input to the judgment means 1709. When the judgment means 1709 determines that the detection result of the input electronic watermark is 'First-generation Only', and that the audio signal is to be recorded onto the recording medium 1713 by the recording means 1712, it sends an instruction to the watermark-generation means 1710 to update the electronic watermark. The judgment by the judgment means 1709 and the instruction to update the electronic watermark can also be performed by a control unit such as a host CPU for controlling the recording apparatus 1707.

On the other hand, channel data that are output from the channel-data-generation means 1704 of the reproduction apparatus 1701 are input to the second channel-selection means 1708, and based on that channel data, the second channel-selection means 1708 selects a channel from the audio signals that are input to the recording apparatus 1707, and sends that audio signal to the watermark-generation means 1710. The watermark-generation means 1710 generates an update watermark signal based on the audio signal send from the second channel-selection means 1708, and sends it to the channel-selection-addition means 1711. Audio signals for all of the channels are input to the channel-selection-addition means 1711, however, it adds the update electronic watermark that was generated by the watermark-generation means 1710 only to the channel that is the same as that selected by the second channel-selection means 1708, then outputs all of the audio signals. The recording means 1712 records the audio signal with the updated electronic watermark onto the recording medium 1713.

In this eighth embodiment, by using a channel-data-generation means and detection means in the reproduction apparatus 1701 as in the embodiment described in FIG. 13, it is possible to lighten the load on the recording apparatus 1707. Currently, in the case of a DVD audio player, there is already a detection means mounted in the reproduction apparatus in order to check whether or not the disc is a pirated version created by illegal copying during reproduction. Therefore, by using the result detected by the reproduction apparatus 1701 when updating the electronic watermark in the reproduction apparatus 1701, it is possible to reduce the amount of operation processing and the amount of memory required for the recording apparatus 1707.

The reproduction apparatus 1701 is not limited to a DVD audio player, and can be any typical audio player that has a function for detecting an electronic watermark as described for this embodiment. Moreover, the first recording medium 1702 is not limited to a DVD audio disc, and can be another kind of recording medium—such as a semiconductor memory card. Furthermore, the supplied audio signal does not have to be data that are recording on the first recording medium and reproduced by the reproduction means 1703, but can also be an audio signal that is supplied by decoding data that are distributed over a network such as the Internet.

(Embodiment 9)

Next, a ninth embodiment of the invention will be explained with reference to FIG. 18. This ninth embodiment is similar to the fifth embodiment explained using FIG. 13, however, it differs in that during recording, the electronic watermark of part of the channels is updated and the channel data with updated electronic watermark is correlated with the audio signal and recorded on the recording medium 1810, and during reproduction, the audio signal is output after updating the watermark for channels without an updated electronic watermark.

Figure 18:
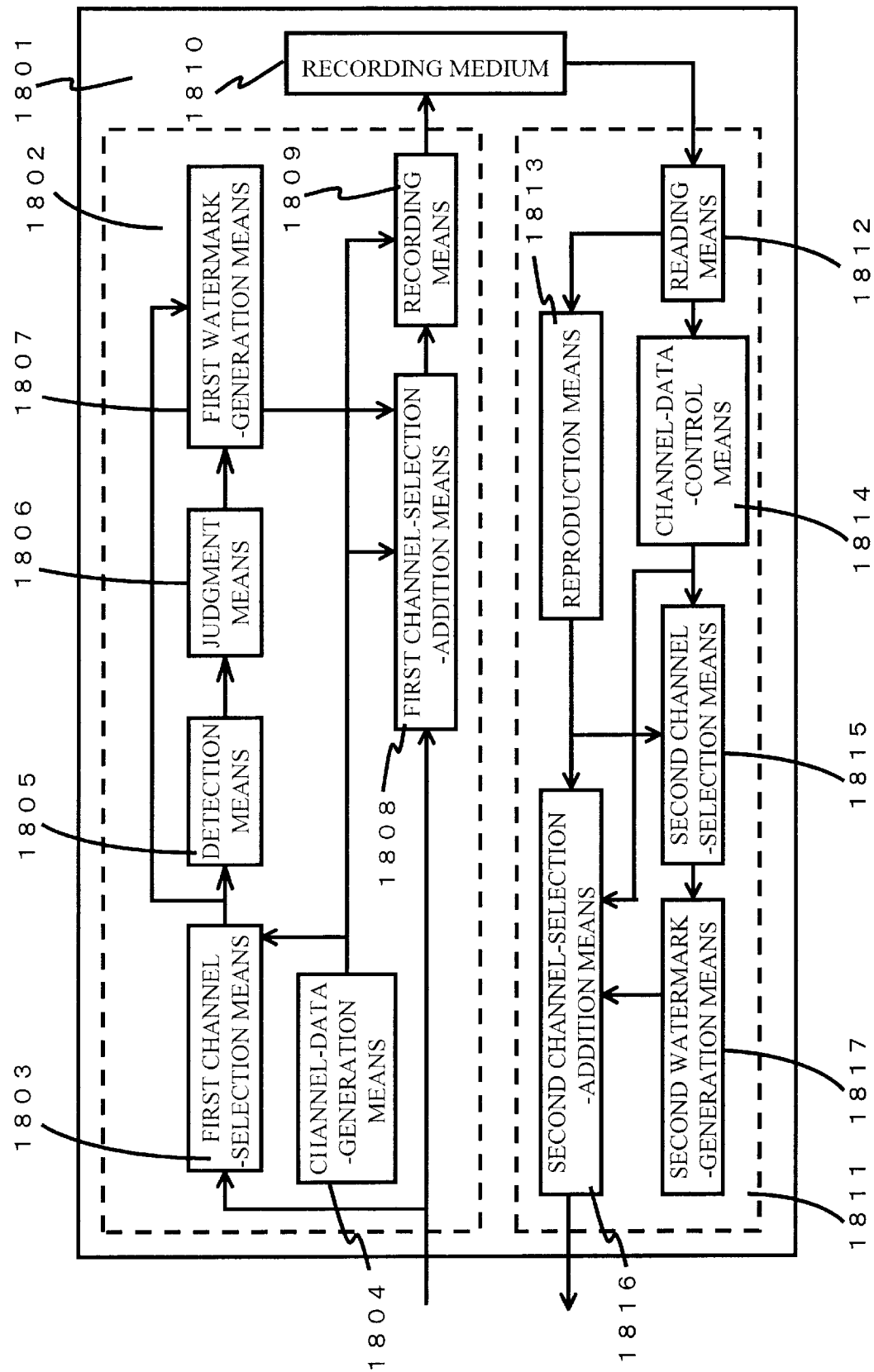
FIG. 18 is a block diagram of the reproduction apparatus and recording apparatus of a ninth embodiment of the invention.
Figure 19:
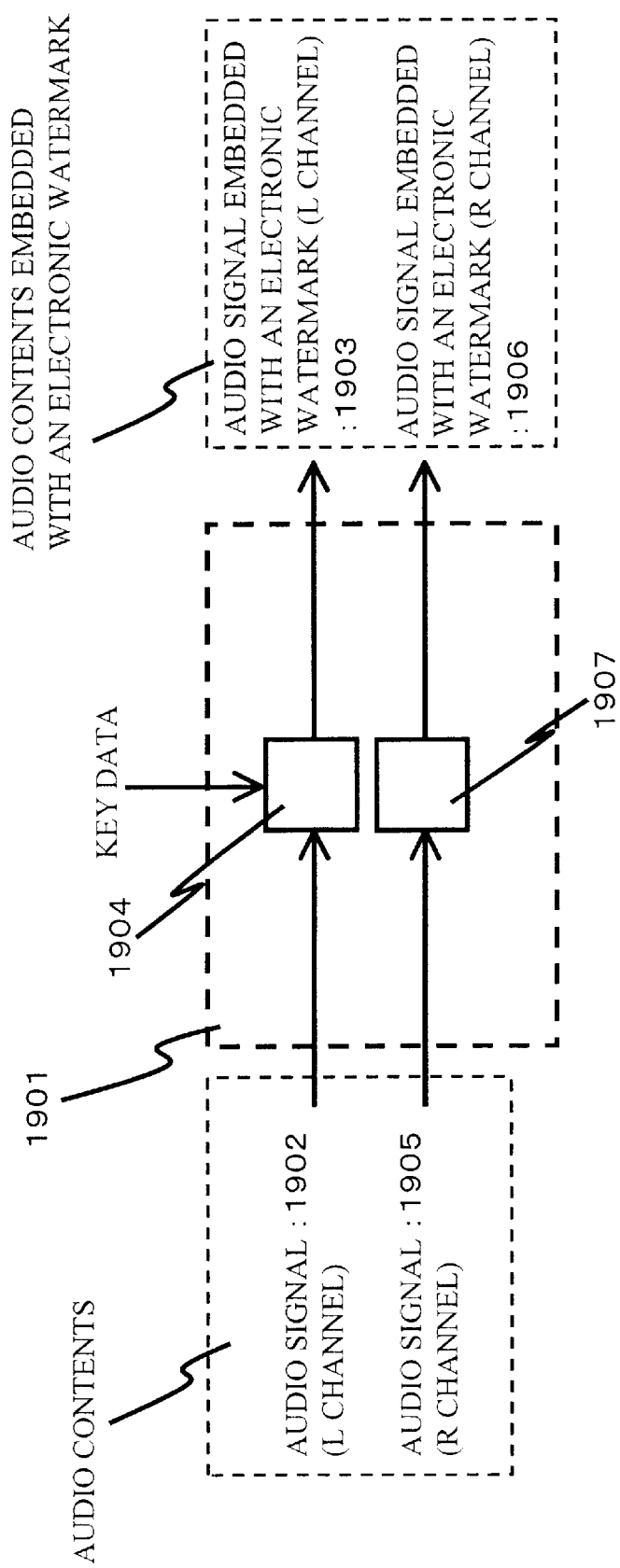
FIG. 19 is a block diagram that explains a prior data-addition apparatus.
Figure 20:
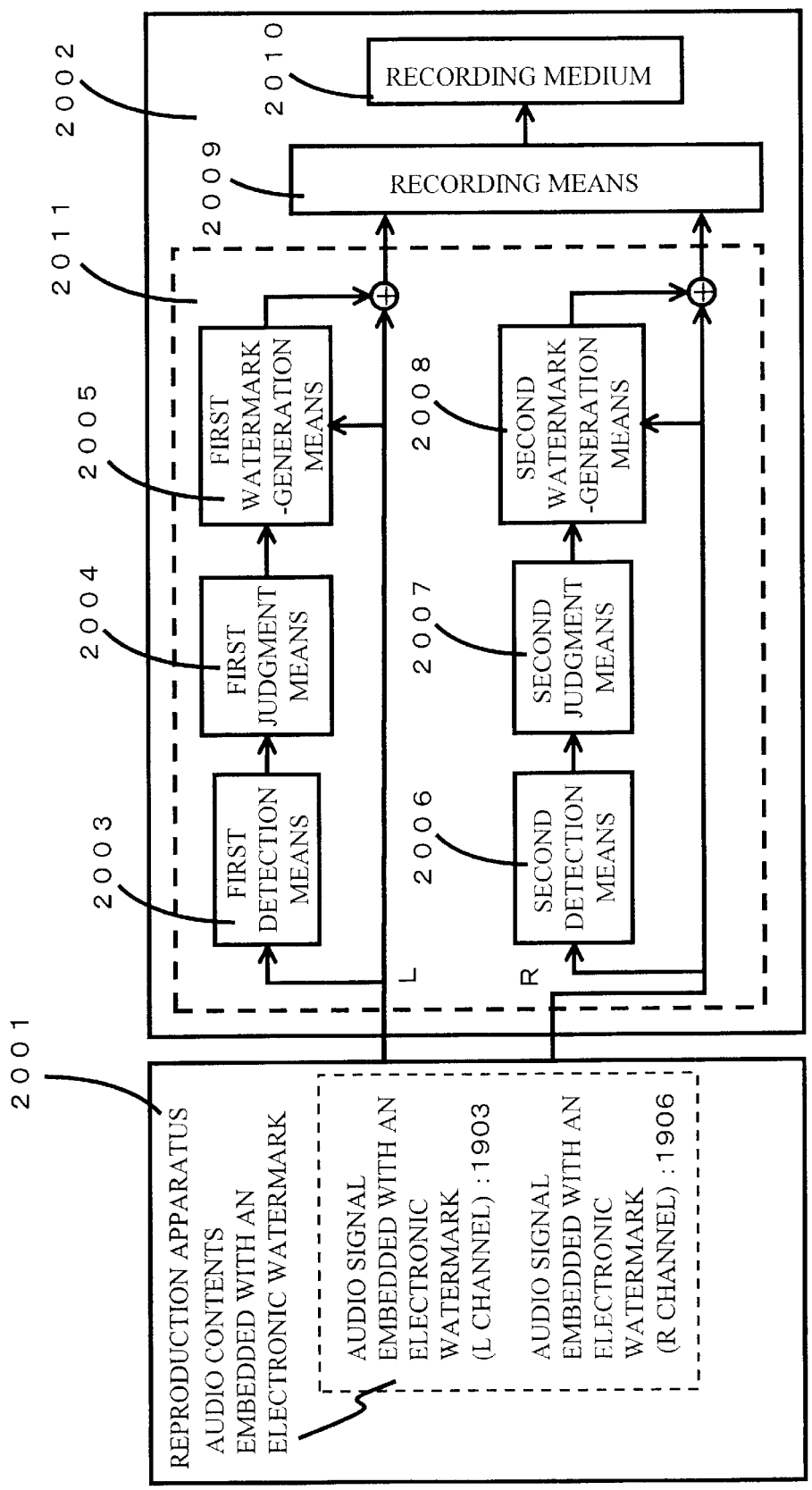
FIG. 20 is a block diagram that explains a prior data-update apparatus and recording apparatus.

FIG. 18 shows the construction of the recording apparatus 1801. The recording apparatus 1801 comprises a recording unit 1802, a recording medium 1810 on which an audio signal is recorded, and a reproduction unit 1811. Updating the electronic watermark during recording by the recording unit 1802 is performed in nearly the same way as that described for embodiment 5, however, it differs in that the channel data that are generated by the channel-data-generation means 1804 are correlated with the audio signal by the recording means 1809 and then recorded on the recording medium 1810.

Channel data are data that specify the channels for which the electronic watermark is to be updated, and when the recording means 1809 records the audio signal onto the recording medium 1810, it correlates the channels with updated electronic watermark with the audio signal before, and then is recorded. The recording method can be a method of recording the channel data every time the channel-data-generation means 1804 switches the channel data, or can be a method of recording channel data for each frame when recording the audio signal in frame units, or can be a method of recording channel data for each sample of the audio signal, or the can be a method of recording channel data in units other than these as long as the channel data are recorded such that it is possible for the channel-data-control means 1814 of the reproduction unit 1811 to determine which channels have an updated electronic watermark.

The audio signal, of which part of the channels have an updated electronic watermark, and the channel data, which indicates which channels have an updated electronic watermark, are recorded onto the recording medium 1810 in this way.

Next, the reproduction unit 1811, by way of a reading means 1812, reads the data recorded on the recording medium and outputs the data to the reproduction means 1813 and channel-data-control means 1814. The reproduction means 1813 converts and outputs the read data to an electronic audio signal. The channel-data-control means 1814 determines which channels have an updated electronic watermark, and in order to select a channel that has not been updated, sends the channel data to a second channel-selection means 1815 and a second channel-selection-addition means 1816. The channel that is specified by the channel-data-control means 1814 can be selected at random from the channels that have not been updated, or, it is not shown in FIG. 18, but it also is possible to use the output signal from the reproduction means 1813, as was explained for embodiment 6, to detect the level of the audio signal and select the channel from among the channels without an updated watermark that has the highest amplitude level. Moreover, other methods are also possible as long as it is possible for the channel-data-control means 1814 to select a channel not having an updated electronic watermark.

The second channel-selection means 1815 selects and outputs the channel that was specified by the channel-data-control means 1814 from among the audio signals of all of the channels output by the reproduction means 1813. The second watermark-generation means 1817 generates an update watermark signal based on the audio signal of the channel that was selected by the second channel-selection means 1815, and outputs that watermark signal to the second channel-selection-addition means 1816. The audio signal of all of the channels output from the reproduction means 1813 are input to the second channel-selection-addition means 1816, and the second channel-selection-addition means 1816 adds the update watermark signal that was generated by the second watermark-generation means 1817 to the audio signal of the channel that was specified by the channel-data-control means 1814, and outputs the audio signals for all of the channels.

The audio signal output from the recording apparatus 1801 in this way can be output after updating the electronic watermarks of the channels of the audio signal recorded on the recording medium 1810 that have not been updated, and this makes it possible for a more rigid system of copyright protection.

In the explanation above, the recording apparatus 1801 comprises a recording unit 1802 and reproduction unit 1811, and each updates the electronic watermark of a different channel during recording and reproduction, however, it is also possible for the recording apparatus to comprise only a recording unit 1802 and to locate the reproduction unit 1811 in a separate reproduction apparatus.

(Effect of the Invention)

The following effects can be obtained with the invention described above:

(1) By having the signal-addition means add an addition signal to only an addition-target signal that includes the input audio signals A and B for example, it is possible to add the addition signal to both the audio signal A and audio signal B. Therefore, it is possible to greatly reduce the amount of operations performed by the data-addition apparatus, and thus it is possible to reduce costs when manufacturing the data-addition apparatus.

(2) The third operation means outputs a detection-target signal that includes all of the input audio signals, and the signal-detection means detects a specific addition signal from the detection-target signal. In this data-detection apparatus, by using the third operation means to perform simple operations on the audio signals A, B embedded with an electronic watermark, it is possible to use a prior electronic detection method to easily detect the addition signal.

(3) The fourth operation means outputs a removal-target signal that includes all of the input audio signals, and a separation signal that includes at least two audio signals from the input audio signals, and the signal-detection means detects the specified addition signal from the removal-target signal. Furthermore, the signal-removal means outputs a removal-completed signal from which the addition signal that was detected by the signal-detection means was removed from the removal-target signal and then a fifth operation means separates the audio signals from which the addition signal was removed based on the removal-completed signal and separation signal. In this kind of data-removal apparatus, the removal-target signal includes all of the audio signals, so it is possible to remove the addition signal from all with one removal process, and thus it is possible to reduce the amount of operations that are required for removing the addition signal separately for each audio signal by several factors (1/number of audio signals).

(4) By detecting the electronic watermark embedded in music only once, and determining from that detection result whether or not that electronic watermark needs to be updated, then stopping detection and performing the update, it is possible to update the electronic watermark with few operations. Moreover, it is possible to conserve the amount of power consumed by the recording means. Furthermore, the detection means not only performs detection just one time, but by performing detection several times it is possible to prevent improper behavior just as trying to avoid updating the electronic watermark.

(5) By making the length of electronic watermark update interval a fraction (1/number of channels) of the length of the detection interval at most, it is possible to reduce the amount of operations required for detecting and updating the electronic watermark of an audio signal having two or more channels.

(6) By updating the electronic watermark of the channel of the audio signal having the highest amplitude level, it is possible to maintain reliability of controlling copying of the audio signal.

(7) By generating an update watermark signal based on a signal that is the sum of the signals of a plurality of channels having high correlation, it is possible to update the electronic watermark for a plurality of channels without increasing the amount of operations.

(8) By sending the electronic watermark that was detected by the reproduction apparatus to the recording apparatus, and having the recording apparatus use that sent electronic watermark to update the watermark without having to perform detection, it is possible to reduce the amount of operations required for the recording apparatus to update the electronic watermark.

(9) By having the recording apparatus update the electronic watermark for part of the channels when recording the audio signal, and then updating the electronic watermark for only the channels without an updated electronic watermark when reproducing the recorded audio signal, it is possible to reduce the amount of operations required for updating the electronic watermark for a plurality of channels.

What is claimed is:

1. A data-update apparatus that updates data embedded in an input signal having a plurality of channels and comprising:
   a channel-selection means that selects one or more channels from said input signal and outputs that channel signal;
   a detection means that detects data that are embedded in said channel signal;
   a judgment means to which said data are input and that determines whether or not to update said data;
   an update-signal-generation means that generates an update signal for updating said data based on an update instruction from said judgment means and said channel signal; and
   a channel-selection-addition means that adds said update signal to said channel signal.

2. The data-update apparatus of claim 1 wherein said channel-selection means switches the selection of two or more channels at set time intervals.

3. The data-update apparatus of claim 2 wherein the detection interval for detecting data embedded in said input signal by said detection means is the number of channels times longer than said set time interval.

4. The data-update apparatus of claim 1 wherein a channel-control means compares the amplitude levels of each channel signal in said input signal and specifies the channel with the highest amplitude level.

5. The data-update apparatus of claim 4 wherein said channel-control means specifies a channel based on a log of selected channels.

6. The data-update apparatus of claim 1 wherein said channel-selection-addition means also adds said update signal to channels not selected by said channel-selection means.

7. The data-update apparatus of claim 1 wherein channel data specifying the channel to be selected are input to said channel-selection means, and said channel-selection means outputs a channel signal based on said channel data.

8. The data-update apparatus of claim 1 further comprising a recording means that correlates and records said input signal and channel signal selected by said channel-selection means.

9. A reproduction apparatus comprising:
- a reproduction means that reproduces the input signal embedded with data and outputs that signal as an output signal;
- a channel-selection means to which said output signal is input, and which selects one or more channels and outputs that channel signal together with the selected channel as channel data;
- a detection means that detects and outputs data embedded in said channel signal; and
- a transmission means that transmits the channel data output by said channel-selection means and data output by said detection means to a specified terminal.

10. A reproduction apparatus comprising:
- a reproduction means that reproduces an input signal having a plurality of channels;
- a channel-selection means that selects a channel from said input signal and from channel data that indicates whether data embedded in the input signal have been updated, for which said data have not been updated;
- an update-signal-generation means that detects data embedded in said channel signal and outputs an updated signal for updating said data; and
- a channel-selection-addition means that adds said update signal to the output signal from said reproduction means.

11. A data-update method of updating data embedded in an input signal having a plurality of channels and comprising:
- a channel-selection step that selects one or more channels from said input signal and outputs that channel signal;
- a detection step that detects data that are embedded in said channel signal;
- a judgment step that determines whether or not to update said data based on said data;
- an update-signal-generation step that generates an update signal for updating said data based on the judgment result of said judgment step and said channel signal; and
- a channel-selection-addition step that adds said update signal to said channel signal.

12. A program that is executed by a computer to update data embedded in an input signal having a plurality of channels and comprising:
- a channel-selection step that selects one or more channels from said input signal and outputs that channel signal;
- a detection step that detects data that are embedded in said channel signal;
- a judgment step that determines whether or not to update said data based on said data;
- an update-signal-generation step that generates an update signal for updating said data based on the judgment result of said judgment step and said channel signal; and
- a channel-selection-addition step that adds said update signal to said channel signal.

13. A data-addition apparatus that adds a specified addition signal to each of a plurality of audio signals and comprising:
- a first operation means that outputs an addition-target signal that includes all of said input audio signals, and a separation signal that includes at least two of said audio signals;
- a signal-addition means that adds said specified addition signal to said addition-target signal and outputs the result as an addition-completed signal; and
- a second operation means that separates the audio signal to which said addition signal has been added based on said addition-completed signal and said separation signal.

14. The data-addition apparatus of claim 13 wherein said addition-target signal is a signal that is the sum of all said input audio signals added together.

15. A data-detection apparatus that detects a specified addition signal in each of the audio signals to which said addition signal was added and comprising:
- a third operation means that outputs a detection-target signal that includes all of said input audio signals; and
- a signal-detection means that detects said specified addition signal from said detection-target signal.

16. A data-removal apparatus that removes said addition signal from each of said audio signals to which the specified addition signal was added and comprising:
- a fourth operation means that outputs a removal-target signal that includes all of said input audio signals, and a separation signal that includes at least two audio signals of said audio signals;
- a signal-detection means that detects said specified addition signal from said removal-target signal;
- a signal-removal means that removes the addition signal that was detected by said signal-detection means from said removal-target signal and outputs the results as a removal-completed signal; and
- a fifth operation means that separates the audio signals, from which said addition signal was removed, based on said removal-completed signal and said separation signal.

17. A data-update apparatus that updates a first addition signal that is added to each of a plurality of audio signals and comprising:
- a sixth operation means that outputs a detection-target signal that includes all of said input audio signals, and a separation signal that includes at least two audio signals of said audio signals;
- a signal-detection means that detects said first addition signal from said detection-target signal;
- a signal-addition means that adds a second addition signal to said detection-target signal based on said first addition signal that was detected by said signal-detection means, and outputs the result as an addition-completed signal; and
- a seventh operation means that separates each of said audio signals, to which said first addition signal and said second addition signal were added, based on said addition-completed signal and said separation signal.

18. The data-update apparatus of claim 17 further comprising a signal-removal means that removes said first addition signal, which was detected by said signal-detection means from said detection-target signal that was output by said sixth operation means, and outputs the results as a removal-completed signal; wherein
- said signal-addition means adds said second addition signal to said removal-completed signal and outputs the result as an addition-completed signal; and wherein
- said seventh operation means separates each of said audio signals, to which said second addition signal was added, based on said addition-completed signal and said separation signal.

* * * * *